United States Patent [19]
Kawabe et al.

[11] Patent Number: 5,819,044
[45] Date of Patent: Oct. 6, 1998

[54] NAME SERVICE APPARATUS USING RESOURCE MANAGEMENT, NAME RESOLUTION AND VIRTUAL RESOURCE REALIZATION FOR REALIZING A VIRTUAL RESOURCE BY APPLYING THE PROCEDURE TO THE ACTUAL RESOURCE

[75] Inventors: Shigehisa Kawabe; Sunao Hashimoto; Ichiro Yamashita; Kazunori Horikiri, all of Ebina, Japan

[73] Assignee: Fuji Xerox Co., Ltd., Tokyo, Japan

[21] Appl. No.: 534,317

[22] Filed: Sep. 27, 1995

[30] Foreign Application Priority Data

Oct. 12, 1994 [JP] Japan .................................. 6-246350

[51] Int. Cl.$^6$ ................................................. G06F 15/16
[52] U.S. Cl. ................................ 395/200.56; 395/200.53
[58] Field of Search ............................ 362/116; 395/500, 395/672, 400, 671, 109, 200.56, 200.53

[56] References Cited

U.S. PATENT DOCUMENTS

| 4,253,145 | 2/1981 | Goldberg | 395/500 |
| 4,918,595 | 4/1990 | Kahn et al. | 395/672 |
| 5,327,559 | 7/1994 | Priven et al. | 395/671 |
| 5,337,412 | 8/1994 | Baker et al. | 395/406 |
| 5,377,323 | 12/1994 | Vasudevan | 395/200.56 |
| 5,402,528 | 3/1995 | Christopher et al. | 395/109 |
| 5,515,248 | 5/1996 | Sestak et al. | 362/116 |

FOREIGN PATENT DOCUMENTS

| 63-236436 | 10/1988 | Japan . |
| 5-189389 | 7/1993 | Japan . |
| 5-216799 | 8/1993 | Japan . |
| 5-274274 | 10/1993 | Japan . |
| 5-342134 | 12/1993 | Japan . |

OTHER PUBLICATIONS

Comer et al., "A Model of *Name Resolution* in Distributed Systems" Proc. 6th Int. Conf. on Distrubuted Computing System, 1986; pp. 523–530.

Maruzen, Local Area Network, Outline of Ethernet, 2nd Revised Edition; pp. 222–229.

Shuppan, Distributed Operating System, That Coming Next to UNIX, pp. 243–264.

*Primary Examiner*—Thomas C. Lee
*Assistant Examiner*—David Ton
*Attorney, Agent, or Firm*—Oliff & Berridge, PLC

[57] ABSTRACT

In a name service apparatus, a virtual resource management table has three sorts of fields, name, position and procedure. For a virtual resource, its name, position of an actual resource and name of procedure to handle the actual resource are held in correspondence to each other. On receiving inquiry request for name, a communication section requests a retrieval section of a name resolution section to carry out name resolution. The retrieval section retrieves the virtual image management table using the received name as a key. If the received name is a virtual resource, the position of the actual resource and the procedure name are obtained from the table and access to the virtual resource becomes possible.

11 Claims, 17 Drawing Sheets

| NAME | POSITION OF RESOURCE |
|---|---|
| NAME1 | ATTR1 |
| NAME2 | ATTR2 |
| NAME3 | ATTR3 |

| OPERATOR | TYPE | PRIORITY | PROCEDURE |
|---|---|---|---|
| RT1 | TY1 | PR1 | RV1 |
| RT2 | TY2 | PR2 | RV2 |
| RT3 | TY3 | PR3 | RV3 |

| DELIMITER | . |

| NAME | POSITION OF RESOURCE |
|---|---|
| image1 | location1 |
| image2 | location2 |

| OPERATOR | TYPE | PRIORITY | PROCEDURE |
|---|---|---|---|
| scale | x.scale.y | 2 | pnmscale ( y,x ) |
| Z | x.Z | 1 | compress ( x ) |

| TOKEN | TYPE |
|---|---|
| image | NAME |
| scale | OPERATOR |
| 2 | PARAMETER |

NAME : image1.scale.2
SYNTAX TREE : (scale image1 2)
PROCEDURE : pnmscale (2, image1)

FIG.18(A)

NAME : image1.scale.2. tiff. Z
SYNTAX TREE : ( Z (tiff (scale image1 2) ) )
PROCEDURE : compress ( pnmtotiff (pnmscale (2, image1 ) ) )

FIG.18(B)

NAME : image1. scale. 2. Z
SYNTAX TREE : ( Z (scale image1 2) )
PROCEDURE : compress (pnmscale (2, image1) ) )

FIG.18(C)

NAME : (pnmfile1. pnmscale.2) . add. pnmfile2
SYNTAX TREE : (add (pnmscale pnmfile1 2) pnmfile2)
PROCEDURE : pnmarith(-add,pnmscale(2,pnmfile1),pnmfile2)

FIG.18(D)

| OPERATOR | TYPE | PRIORITY | PROCEDURE |
|---|---|---|---|
| scale | x.scale.y | ? ? | pnmscale ( y,x ) |
| pnmscale | x.pnmscale.y | ? ? | pnmscale ( y,x ) |
| tiff | x.tiff | ? ? | pnmtotiff (x) |
| add | x.add.y | ? ? | pnmarith(-add,x,y) |
| Z | x.Z | ? ? | compress ( x ) |

FIG.19

NAME SERVICE APPARATUS USING RESOURCE MANAGEMENT, NAME RESOLUTION AND VIRTUAL RESOURCE REALIZATION FOR REALIZING A VIRTUAL RESOURCE BY APPLYING THE PROCEDURE TO THE ACTUAL RESOURCE

BACKGROUND OF THE INVENTION

1. Field of the Invention

The present invention relates to a network information system where resources of a plurality of computer systems to carry out information processing are distributed and arranged on a network and the plurality of computer systems communicate with each other and operate, and more specifically it relates to a name service system which manages name of a resource and position of the resource corresponding to the name and makes resolving from the name to the position.

2. Prior Art

As such a resource management system in the prior art, for example, A. Uetani "Local Area Network, outline of Ethernet" 2nd Revised Edition, pp. 222–229, by Maruzen Company, discloses a resource control system of clearing house service in Xerox Company of U.S.A. In this system, arbitrary number of attributes are in correspondence to names of resources in distributed system and managed by distributed data base, and transforming from name to attributes which includes address is provided. In the clearing house service, such name service is realized.

As another resource management system, for example, M. Maekawa, M. Tokoro, K. Shimizu "Distributed Operating System, That Coming Next to UNIX" (UNIX is a trade mark of UNIX System Laboratories, Inc.) pp. 243–264 by Kyoritsu Shuppan Company, discloses a resource management system of GALAXY operating system. In this system, logical identifier of object and locating information of physical entity of object are in correspondence to each other and are stored in data base which distributed in large area and managed. In this resource management system, all plural pieces of locating information of the object are recorded and managed.

Also a resource management system disclosed in Japanese Patent Laid-Open No. Sho 63-236436 (1988), includes control means where name of an information processing unit and network address, that is, the name of the information processing unit being a resource on a network and the network address being its position are controlled in a table. Name service to retrieve the network address is provided for inquiry in the name from the information processing unit.

In these resource management systems in the prior art, name of a resource and position information of the resource or attribute are in correspondence to each other and controlled in a resource management table or resource management data base, and position information or attribute of the corresponding resource is outputted from the name of the inputted resource. In such a management system of network resource used conventionally, the position of the resource is made virtual in the meaning that the position is hidden. However, regarding treatment of the resource, since the application must take the responsibility, in this meaning, the resource management is not provided so that the treatment of the resource is made virtual.

Particularly, in the system of the prior art, when data processing is applied to a resource (resource 1), a virtual resource (resource 2) is obtained, such treatment cannot be made that the virtual resource (resource 2) is provided with a virtual name (name 2) other than the name (name 1) of the original resource (resource 1). For example, when data processing such as transforming processing of type or access protocol is applied to a resource (resource 1), a virtual resource (resource 2) is obtained, such treatment cannot be made that the virtual resource (resource 2) is provided with a virtual name (name 2) as if the resource having the virtual name (name 2) could be accessed in desired type or access protocol. The prior art does not provide a network information system with high flexibility to enable such treatment. Further, it does not provide a network information system with high flexibility where plural procedure names to treat resources are managed, and depending on state of the system or intention of the user, single or plural procedures can be selected among the plural procedures and be applied to the resources.

SUMMARY OF THE INVENTION

An object of the present invention is to provide a name service apparatus where for a virtual resource obtained as a result of applying the prescribed procedure to the existing resource, the resource management is carried out in correspondence of the position of the existing resource and the procedure name, and a virtual name to each other, thereby resources of the computer system are made virtual and the user can access the virtual resource having desired property only by name and the treatment of the resource has higher flexibility.

Another object of the present invention is to provide a name service apparatus where resources are made virtual on a computer system or on a network system with resources distributed thereby the network information system as a whole has higher flexibility.

According to one aspect of the present invention, there is provided a name service apparatus comprising: resource management means for making correspondence of position of an actual resource existing in a computer system to carry out information processing, name of procedure to treat the actual resource, and name of a virtual resource obtained by executing the procedure to the actual resource; input means for receiving the name of the virtual resource; and name resolution means for obtaining the position of the actual resource and the name of the procedure in correspondence to each other by the resource management means for the name of the virtual resource received by the input means.

According to another aspect of the present invention, there is provided a name service apparatus in a network information system where resources of a plurality of computer systems to carry out information processing are distributed and arranged on a network, and the plurality of computer systems communicate with each other and operate, comprising: resource management means for making correspondence of position of actual resources existing in the plurality of computer systems, name of procedure to handle the actual resources, and name of virtual resources obtained by executing the procedure to the actual resources; input means for receiving the name of the virtual resources; and name resolution means for obtaining the position of the actual resources and the name of the procedure in correspondence to each other by the resource management means for the name of the virtual resources received by the input means.

According to another aspect of the present invention, there is provided a name service apparatus in a network information system where resources of a plurality of computer systems to carry out information processing are distributed and arranged on a network, and the plurality of computer systems communicate with each other and operate, comprising: actual resource management means for making correspondence of name of actual resources existing in the plurality of computer systems and position of the actual resources; virtual name correspondence means for holding the name transforming procedure to transform name of a virtual resource obtained by executing procedure to the actual resources into name of another virtual resource or name of the actual resources, and name of procedure to treat the virtual resource or the actual resources; input means for receiving the name of the virtual resources; and name resolution means for obtaining the name of the procedure to treat the actual resources by applying recursively the name transforming procedure held in the virtual name correspondence means, to the name of the virtual resources inputted by the input means and to the name of other virtual resource obtained by applying the name transforming procedure held in the virtual name correspondence means, and for obtaining the position of the actual resources by the actual resource management means in correspondence to the name of the actual resource obtained by applying the name transforming procedure held in the virtual name correspondence means.

According to still another aspect of the present invention, there is provided a name service apparatus comprising: input means for receiving name of a virtual resource; name analysis means for parsing the name of the virtual resources inputted by the input means, and for delimiting a token that comprise at least a part of the name of the virtual resource; actual resource management means for making correspondence of the token to the position of the actual resource; procedure management means for making correspondence of the token to name of procedure to treat the actual resource; and name resolution means for receiving the token delimit by the name analysis means, and for obtaining the position of the actual resource in correspondence to the token by the actual resource management means and the name of the procedure in correspondence to the token by the procedure management means.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 18 is an explanation diagram of a specific example of name to be inputted, syntax tree to be produced and procedure to be selected;

FIG. 19 is an explanation diagram of another example of a procedure management table;

DESCRIPTION OF THE PREFERRED EMBODIMENTS

Figure 1:
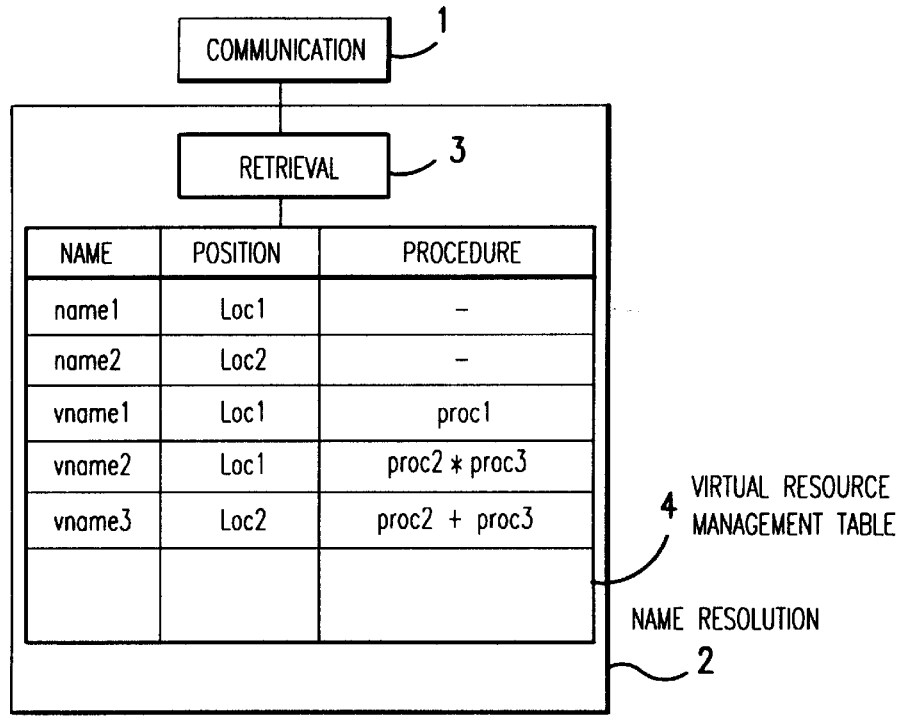
FIG. 1 is a block diagram showing a first embodiment of a name service apparatus of the invention.

FIG. 1 is a block diagram showing a first embodiment of a name service apparatus of the present invention. In FIG. 1, numeral 1 designates a communication section, numeral 2 designates a name resolution section, numeral 3 designates a retrieval section, and numeral 4 designates a virtual resource management table.

The communication section 1 receives name resolution request from a virtual resource realization section (not shown), and requests name resolution to the name resolution section 2. The name resolution section 2 has the retrieval section 3 and the virtual resource management table 4. The retrieval section 3 searches the virtual resource management table 4, and returns information held corresponding to the resolution-requested name.

Figure 27:
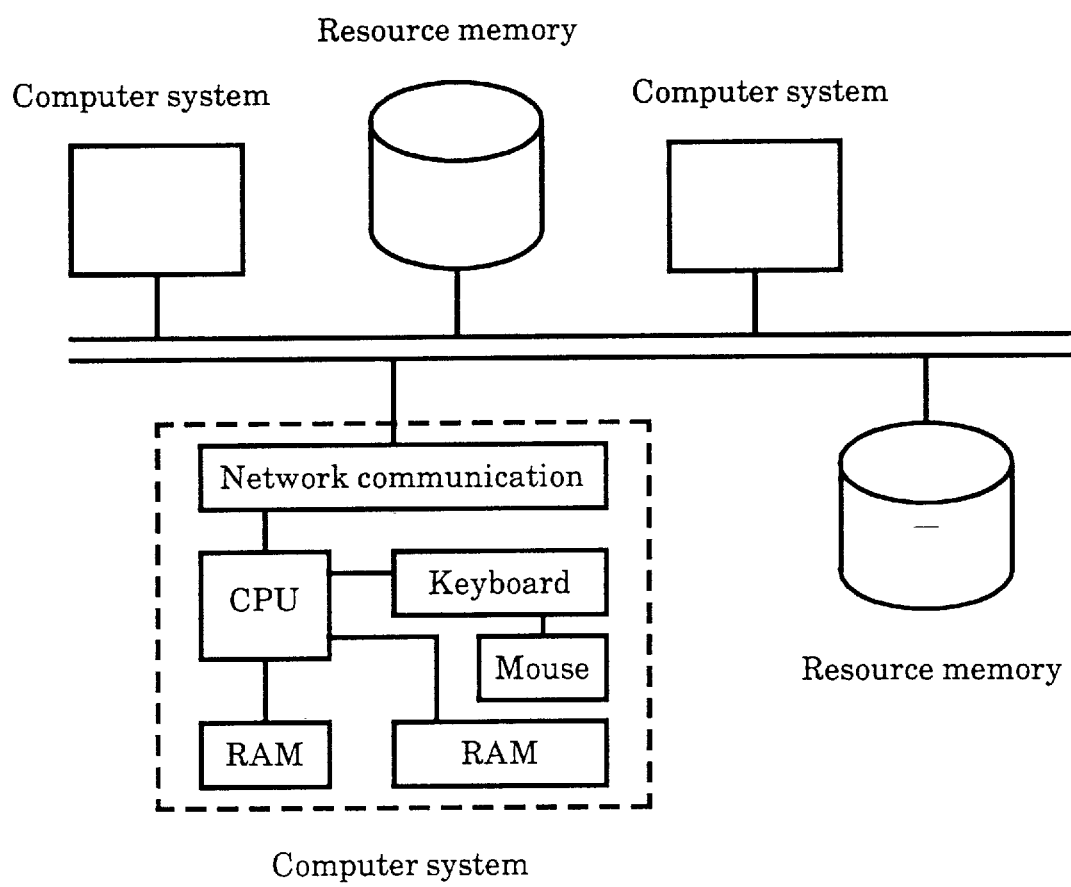
FIG. 27 is a block diagram of an example of a name service apparatus on a network.

The virtual resource management table 4 in FIG. 1 is stored, for example, in a secondary storage or RAM on a computer system as shown in FIG. 27. Retrieval of the virtual resource management table by the retrieval section 3 is realized in that execution program for retrieval held in a RAM or a secondary storage is executed in a CPU. Also a virtual resource realization section (not shown) is one of application programs executed in the CPU.

The virtual resource management table 4 is a table comprising three sorts, name, position and procedure. In an example of the virtual resource management table 4 shown in FIG. 1, rows corresponding to name1 and name2 are for management of actual resources. Positions of resources designated by name1, name2 respectively are Loc1, Loc2 and it is shown that the resources exist by "-" in column of "procedure". On the contrary, rows corresponding to vname1, vname2 and vname3 are for management of virtual resources. Virtual resource designated by vname1 represents a virtual resource obtained by applying procedure proc1 to the actual resource in the position Loc1. Also virtual resource designated by vname2 represents a virtual resource obtained by applying procedures proc2 and proc3 in the order of proc2, proc3 to the actual resource in the position Loc1. Further, virtual resource designated by vname3 represents a virtual resource obtained by applying either the procedure proc2 or the procedure proc3 to the actual resource in the position Loc2.

In this example, although the virtual resource management table 4 controls both actual resource names and virtual resource names, these may be managed separately. Then, names of actual resources may be controlled by a resource management table or the like used conventionally. In such configuration, decision means of discriminating whether the given name is an actual resource name or a virtual resource name must be provided, or a retrieval section of retrieving both tables automatically must be provided. By assembling names in one table as above described, the retrieval section 3 may retrieve names in only one table and efficient name service can be realized.

Also the virtual resource management table 4 need not be realized as one table, but may be realized as plural tables. Then, corresponding to each table or several tables, a plurality of retrieval sections may be provided and retrieving may be carried out concurrently. Further, the virtual resource management table 4 may be constituted not only by table form as above described but also by data base.

In the above-mentioned embodiment, although the description has been made in configuration having the virtual resource realization section (not shown) and the communication section 1, these sections are not essential. If name is given by any means, the name resolution section 2 outputs position of actual resource corresponding to the name or position of the actual resource and procedure name. Then the position of the actual resource and the procedure name outputted from the name resolution section 2 may be plural. When the position of the actual resource and the procedure name are outputted from the name resolution section 2, a formula producing section may be installed for producing formula based on these and providing the formula to a user.

Also in the name resolution section 2 of the above-mentioned embodiment, although the resolution method of one stage is adopted in that position of corresponding resource is obtained from the name of the resource, resolution method of multiple stages may be used in that intermediate expression of position of resource is obtained corresponding to the name of the resource, and final position of the resource is obtained on the intermediate expression.

The name resolution section of this embodiment may be realized as single process of single computer system, or in general, as plural processes operating in mutual communication on single or plural computer systems.

Each of such modifications can be applied also in the following embodiments. In the description of the following embodiments, the description of such modifications may be omitted.

An example of the operation in the first embodiment of the name service apparatus of the present invention will be described. As a specific example, operation is shown when inquiry for the name1 is carried out to the communication section 1. On receiving the inquiry request for the name1, the communication section 1 requests the retrieval section 3 of the name resolution section 2 to carry out the name resolution corresponding to the name1.

The retrieval section 3 retrieves the virtual resource management table 4 using the name1 as a key. As a result of the retrieval, a tuple of three items <name1, Loc1, → is obtained. Since the third item is "-," it is understood that the resource is an actual resource. The communication section 1 carries out communication using the position Loc1 of the actual resource as an answer.

Next, as another specific example, operation will be shown when inquiry for the vname1 is carried out to the communication section 1. On receiving the inquiry request for the vname1, the communication section 1 requests the retrieval section 3 of the name resolution section 2 to carry out the name resolution corresponding to the vname1.

The retrieval section 3 retrieves the virtual resource management table 4 using the vname1 as a key. As a result of the retrieval, a tuple of three items <vname1, Loc1, proc1> is obtained. Since the third item is proc1, the resource is a virtual resource. It is understood that the virtual resource can be obtained by applying the proc1 to the resource existing in the position Loc1 of the actual resource. The communication section 1 carries out communication using the position Loc1 of the actual resource and the procedure name proc1 as an answer.

Thus not only the actual resource but also the virtual resource can be accessed. The procedure is applied to the actual resource thereby the virtual resource can be accessed as if the virtual resource exists actually. Or as in embodiments as described later, such configuration is possible that procedure is executed to an actual resource and a resource corresponding to a virtual resource is generated and accessed.

Here, regarding a virtual resource, an example will be described. For example, reserving service is made a resource so that a specific time is assigned and a meeting room is reserved and a reserving state can be inquired. Then as a virtual resource, a reserving file showing a reserving state of an assigned time as the time table can be made. Access to the reserving file can be executed as access to the reserving service through procedure.

When a result of transforming processing to a file is used, in the first file, an output result of resource transforming processing is a virtual resource. When the resource is made a file in such manner, access to the virtual file is executed as access to the first file through procedure.

Further, a system will be considered in that when name is assigned in "a printer not being outputting" as output destination, a printer not being outputting is searched among printers which can be used, and outputting to the printer is carried out. Resources in this case are respective printers, and the virtual resource is a printer where name corresponds to "a printer not being outputting." In this case, outputting to the virtual resource "the printer not being outputting" is carried out thereby outputting to a printer not being outputting is carried out among printers which can be used. Then the user does not search a printer not being outputting.

In any case, a resource corresponding to a virtual resource does not exist actually. The resource not existing is taken as a virtual resource, and the virtual resource is provided with a name and managed, and access to the virtual resource is carried out through procedure. Similar consideration applies also to the following embodiments.

Figure 2:
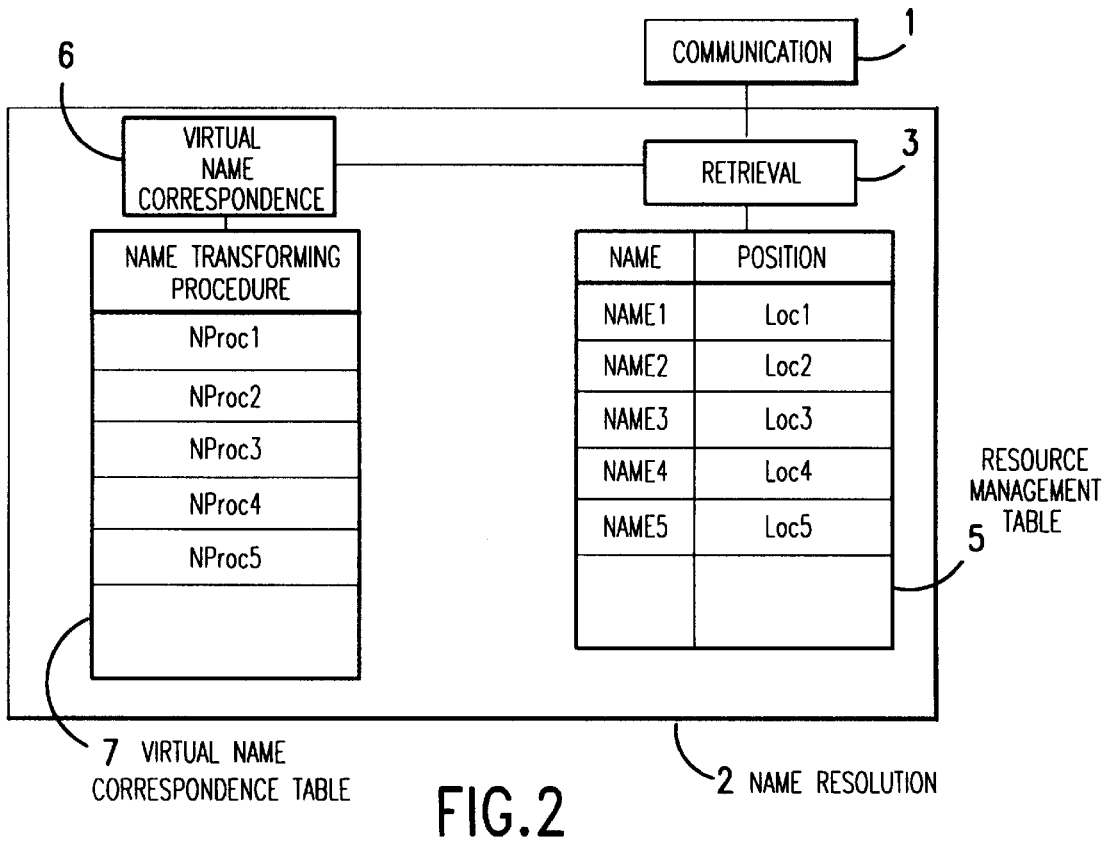
FIG. 2 is a block diagram showing a second embodiment of a name service apparatus of the invention.

FIG. 2 is a block diagram showing a second embodiment of a name service apparatus of the present invention. In FIG. 2, similar parts to those in FIG. 1 are designated by the same reference numerals and the description shall be omitted. Numeral 5 designates a resource management table, numeral 6 designates a virtual name correspondence section, and numeral 7 designates a virtual name correspondence table. In this embodiment, the virtual resource management table 4 in the first embodiment as above described is constituted of the virtual name correspondence table 7 and the resource management table 5.

The resource management table 5 is a table comprising two items, name and position. The resource management table 5 is similar to that used conventionally, and indicates correspondence between name of an actual resource and position of the resource. The virtual name correspondence table 7 is a table comprising name transforming procedure. The name transforming procedure is a procedure having a name as input and having a derivation formula and set of names as output. The virtual name correspondence section 6 receives name of a virtual resource, and inputs the received name into the name transforming procedure stored in the virtual name correspondence table 7, and obtains the derivation formula and set of names outputted from the name transforming procedure. The resource management table 5 is retrieved based on the obtained name, and position of an actual resource is obtained. Then since name failing in retrieval of the resource management table 5 may be name of a virtual resource, each name transforming procedure of the virtual name correspondence table is applied recursively.

In the above-mentioned configuration, although the resource management table 5 and the virtual name correspondence table 7 are provided separately, these may be constituted as one table in similar manner to the first embodiment. Then the name transforming procedure may be entered in a field of name of the resource management table 5, and a field of position of the resource management table 5 may be made "-" for example.

An example of operation in the second embodiment of the name service apparatus of the present invention will be described. If inquiry to the communication section 1 is carried out, the communication section 1 receives name and requests the retrieval section 3 of the name resolution section 2 to carry out the name resolution corresponding to the received name. The retrieval section 3 retrieves the resource management table 5 using the received name as a key. As a result of the retrieval, if the name is registered in the resource management table 5, the position of the corresponding resource is outputted through the communication section 1. If the name is not registered in the resource management table 5, since the name may be name of a virtual resource, resolution of the name is requested to the virtual name correspondence section 6.

Figure 3:
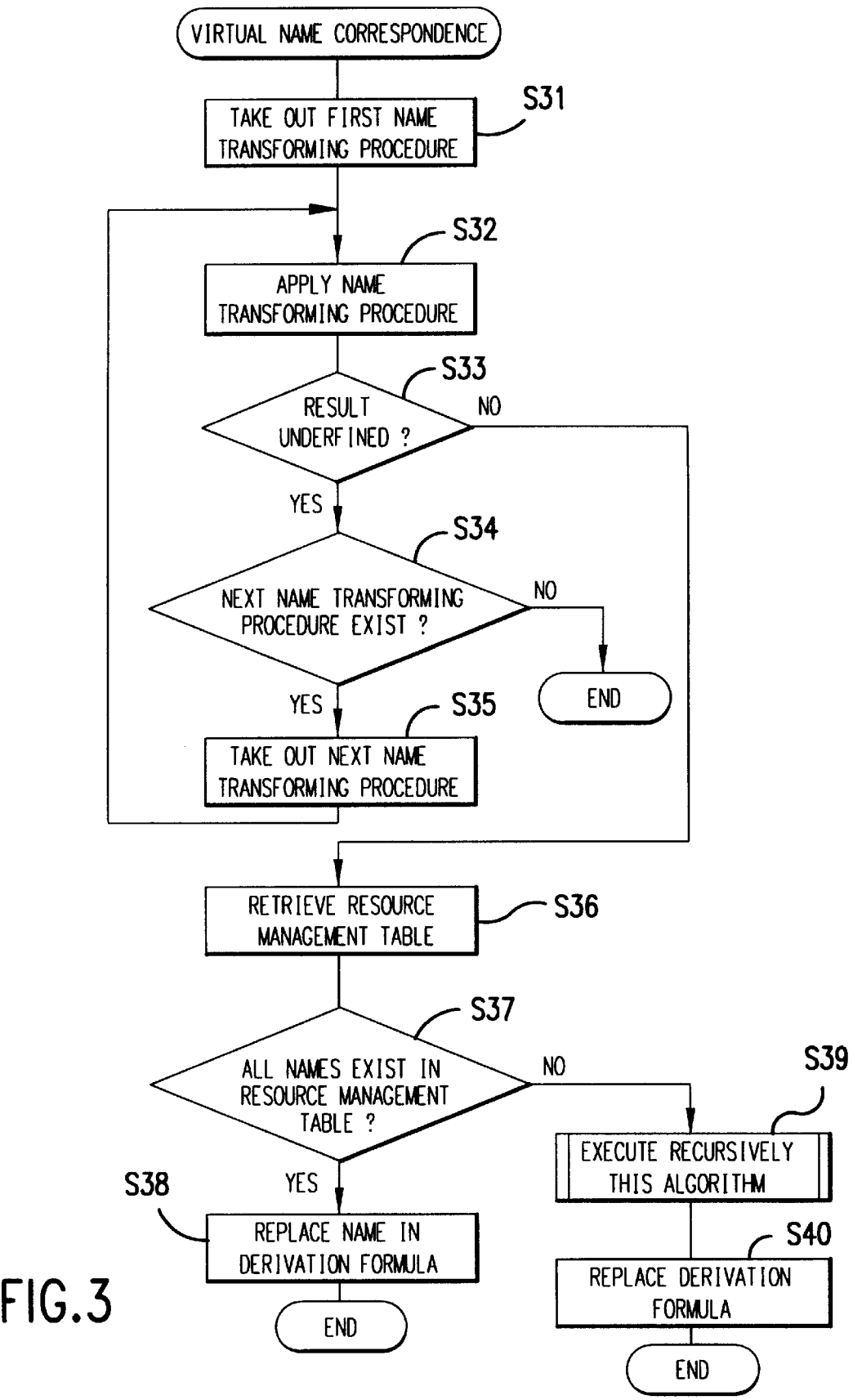
FIG. 3 is a flow chart explaining an example of operation of a virtual name correspondence section 6.

FIG. 3 is a flow chart showing an example of operation of the virtual name correspondence section 6. First, in S31, name transforming procedure is taken out of the first entry of the virtual name correspondence table 7. In S32, the name transforming procedure is applied to the name. In S33, decision is effected regarding whether the result of applying the name transforming procedure to the name is undefined or not. If it is undefined, further in S34, decision is effected regarding whether next name transforming procedure exists or not. If next name transforming procedure does not exist, the derivation formula is deemed undefined and processing of the virtual name correspondence section 6 is finished. If next name transforming procedure exists, in S35, next name transforming procedure is taken out of the virtual name correspondence table 7, and returning to S32, the name transforming procedure is processed.

If the result is not undefined in S33, in S36, the resource management table 5 is retrieved for respective elements of set of names obtained as a result of applying the name transforming procedure. In S37, decision is effected regarding whether all names exist in the resource management table 5 or not. If all names exist in the resource management table 5, in S38, new derivation formula is produced where names in derivation formula obtained by execution of the name transforming procedure are changed at position of the actual resource obtained by the resource management table 5, and the produced derivation formula is returned as a result and the processing is finished.

In S37, if the name not written in the resource management table 5 exists in elements of set of names, in S39, algorithm shown in FIG. 3 is executed recursively for each name, and in S40, a part of the derivation formula is replaced by a derivation formula obtained by recursive execution. However, if transforming of the same name becomes necessary at the midway of transforming of some name, the result shall be undefined.

Since recursive configuration is made and names are transformed in multiple stages thereby procedure is made modules. The designs and implementations of the virtual resource are structured, and a part of the procedure corresponding to a virtual name can be shared commonly and system being compact and having high flexibility can be constituted.

An example of the above-mentioned operation will be described based on a specific example. As shown in FIG. 2, information is stored in the resource management table 5 and the virtual name correspondence table 7. Here, when name removing the character string ".Z" from the end of the given name is made N, the name transforming procedure NProc1 shall be procedure of returning set of elements by N only and formula of Proc1(N). Also when name having all characters to constitute the given name being made capital letters is made N', the name transforming procedure NProc2 shall be procedure of returning set of elements by N' only and formula of Proc2 (N').

Now, name being name1.Z is given. Operation in the case of carrying out inquiry for the name will be described. First, the retrieval section 3 retrieves the resource management table 5 using the given name name1.Z as a key. However, since the corresponding item does not exist, the retrieval of name1.Z is requested to the virtual name correspondence section 6.

The virtual name correspondence section 6 executes algorithm as shown in FIG. 3. That is, in S31, the name transforming procedure NProc1 is taken out of the first entry from the virtual name correspondence table 5, and in S32, the name transforming procedure NProc1 is applied to name1.Z. As a result, the procedure NProc1 outputs set of name1s and the derivation formula Proc1 (name1) . Since this result is not undefined, process is advanced to S36.

In S36, the resource management table 5 is retrieved using elements of set of outputted names, i.e., name1 as a key. However, since the corresponding item does not exist in the resource management table 5, process is advanced from S37 to S39, and the algorithm shown in FIG. 3 is again applied to name1 recursively.

In S31, the name transforming procedure NProc is taken out of the first entry of the virtual name correspondence table 7, and in S32, the name transforming procedure is applied to the name1. Since this result is undefined, process is advanced from S33 to S34. Since the name transforming procedure still remains, in S35, next name transforming procedure NProc2 is taken out of the virtual name correspondence table 7, and in S32, the name transforming procedure is applied to the name name1. As a result, the procedure NProc2 outputs NAME1 as set of names and outputs Proc2 (NAME1) as derivation formula. Since this result is not undefined, process is advanced from S33 to S36.

In S36, the resource management table 5 is retrieved using NAME1 as a key, and as a result, Loc1 is obtained. Since the name exists in the resource management table 5, process is advanced from S37 to S38, and based on this result, NAME1 of the derivation formula Proc2 (NAME1) is replaced by Loc1 and Proc2 (Loc1) is obtained.

Further, process is returned to the original processing called recursively, and the name1 of the derivation formula Proc1 (name1) is replaced by Proc2 (Loc1) obtained in the recursive processing and the derivation formula Proc1 (Proc2 (Loc1)) is obtained and the processing is finished. The retrieval section 3 receives the derivation formula Proc1 (Proc2 Loc1) from the virtual name correspondence section 6 and delivers this to the communication section 1.

Figure 4:
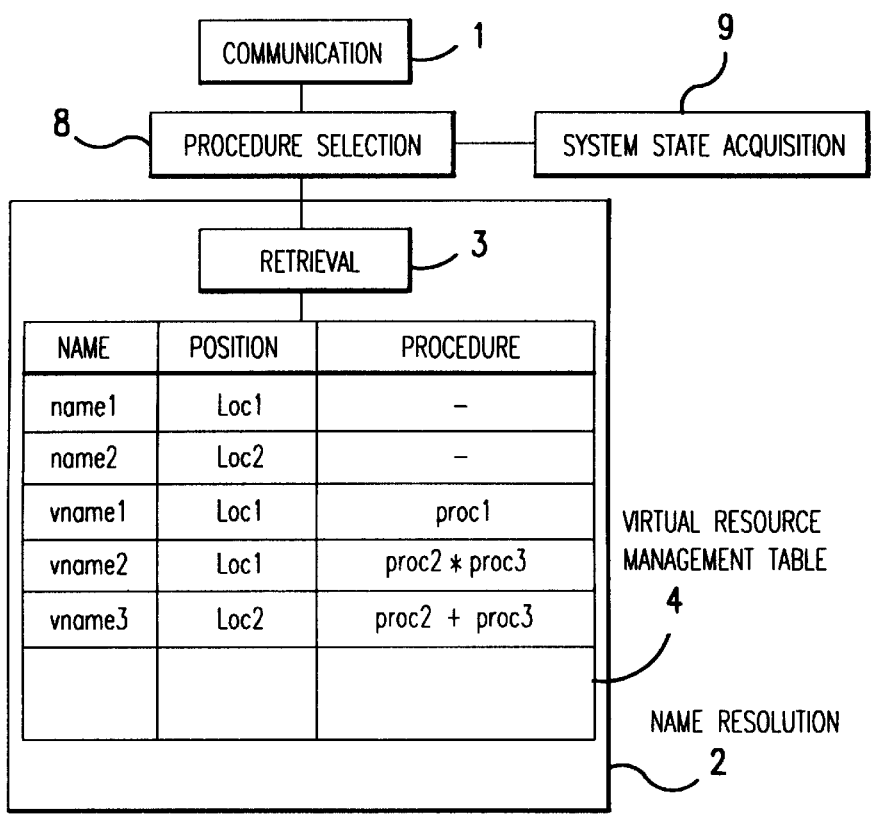
FIG. 4 is a block diagram showing a third embodiment of a name service apparatus of the invention.

FIG. 4 is a block diagram showing a third embodiment of a name service apparatus of the present invention. In FIG. 4, similar parts to those in FIG. 1 are designated by the same reference numerals and the description shall be omitted. Numeral 8 designates a procedure selection section, and numeral 9 designates a system state acquisition section. In the third embodiment, the procedure selection section 8 and the system state acquisition section 9 are added to the configuration of the first embodiment and procedure is selected depending on the state of the system. These sections may be added also to the configuration of the second embodiment.

The system state acquisition section 9 returns parameter determined by the state of the system in response to request of the procedure selection section 8. The procedure selection section 8 delivers names given from the communication section 1 to the retrieval section 3, and from procedure returned as the result, procedure indicated by the parameter returned by the system state acquisition section 9 is selected, and the position of the actual resource and the selected procedure are returned to the communication section 1. Thereby the virtual resource matched to the state of the system can be accessed. The user can access a desired virtual resource even if he does not know the state of the system.

An example of operation in the third embodiment of the name service apparatus of the present invention will be described. As a specific example, operation in the case of inquiring for vname3 to the communication section is shown. The system state acquisition section 9 returns "2" as parameter corresponding to state of the present system.

On receiving the inquiry request for vname3, the communication section 1 requests the procedure selection section 8 to carry out the name resolution for vname3. The procedure selection section 8 requests the retrieval section 3 to carry out the name resolution corresponding to vname3, and at the same time, inquires for the present state of the system to the system state acquisition section 9. The retrieval section 3 retrieves the virtual resource management table 4 using vname3 as a key, and obtains a tuple of three items <vname3, Loc2 proc2+proc3> and delivers the tuple of three items to the procedure selection section 8. Also the system state acquisition section 9 delivers "2" as parameter corresponding to the present state of the system to the procedure selection section 8. The procedure selection section 8 selects "proc3" being the second procedure according to the parameter "2" among procedure "proc2+proc3" in the set of three items obtained from the retrieval section 3, and returns the tuple of three items <vname3, Loc:2, proc3> to the communication section 1. The communication section 1 carries out communication using Loc3, proc3 as answer.

Figure 5:
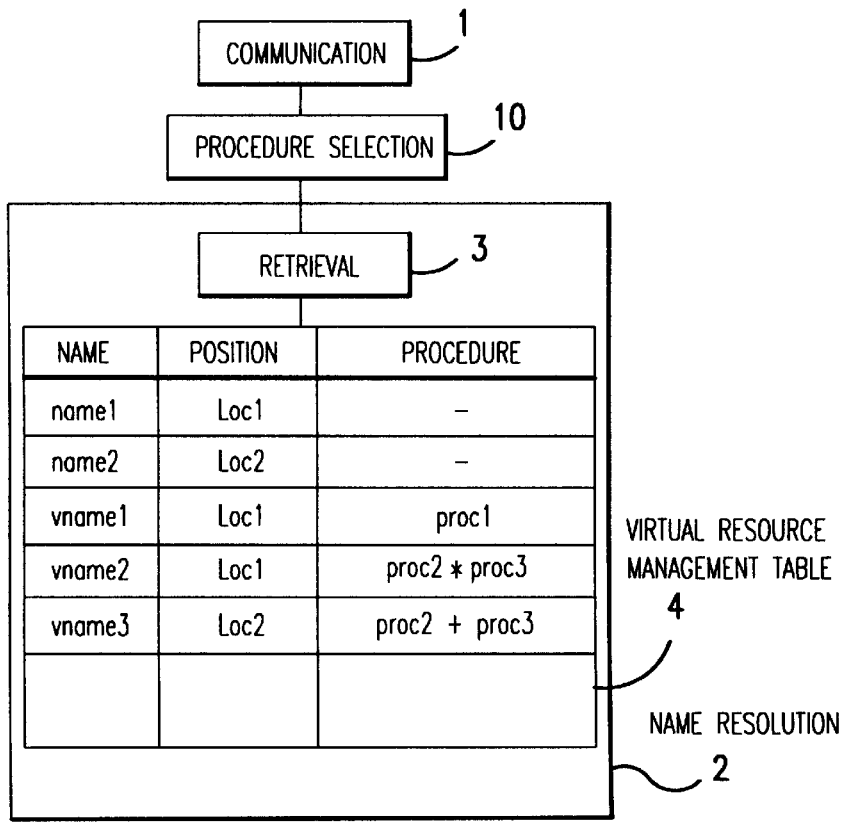
FIG. 5 is a block diagram showing a fourth embodiment of a name service apparatus of the invention.

FIG. 5 is a block diagram showing a fourth embodiment of a name service apparatus of the present invention. In FIG. 5, similar parts to those in FIG. 1 are designated by the same reference numerals and the description shall be omitted. Numeral 10 designates a procedure selection section. In this example, being different from the third embodiment as above described, the procedure selection section 10 selects procedure according to parameter assigned from the outside. Also in this embodiment, the procedure selection section 10 may be added not only to the configuration of the first embodiment but also to the configuration of the second embodiment.

The procedure selection section 10 separates name and parameter from data sent to the communication section 1, and delivers the name to the retrieval section 3, and from procedure returned as the result, procedure shown by the parameter is selected and the position of the actual resource and the selected procedure are returned to the communication section 1.

Parameters used by the procedure selection section 10 may be constituted in addition to that obtained through the communication section 1, in setting in manual operation from a keyboard or the like by a user or in using a result of executing some processing. Thereby the virtual resource to be accessed can be changed in response to command from the user or the result of some processing.

An example of operation in the third embodiment of the name service apparatus of the present invention will be described. As a specific example, operation in the case of giving vname3 and parameter "2" to the communication section 1 is shown. On receiving the inquiry request for the parameter "2" and vname3, the communication section 1 delivers the parameter "2" and vname3 to the procedure selection section 10, and requests to carry out the name resolution for vname3 under condition of the parameter "2". The procedure selection section 10 requests the retrieval section 3 to carry out the name resolution corresponding to vname3. The retrieval section 3 retrieves the virtual resource management table 5 using vname3 as a key, and obtains a tuple of three items <vname3, Loc2 proc2+proc3> and delivers the tuple of three items to the procedure selection section 10. The procedure selection section 10 selects the second "proc3" among procedure "proc2+proc3" in the set of three items based on the parameter "2", and returns the tuple of three items <vname3, Loc2 proc3> to the communication section 1. The communication section 1 carries out communication using Loc2 proc3 as answer.

Figure 6:
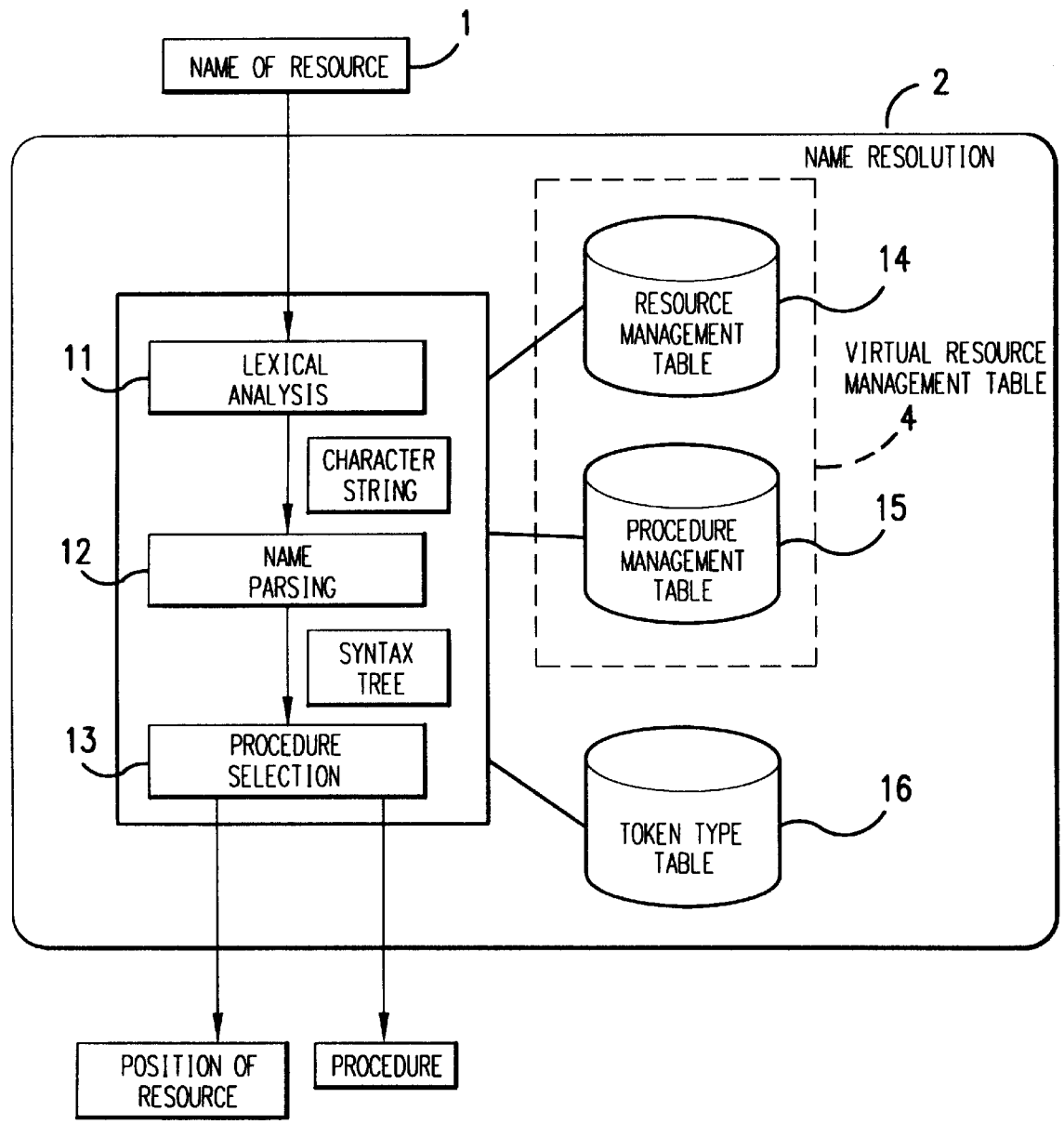
FIG. 6 is a block diagram showing a fifth embodiment of a name service apparatus of the invention.

FIG. 6 is a block diagram showing a fifth embodiment of a name service apparatus of the present invention. In FIG. 6, numeral 2 designates a name resolution section, numeral 4 designates a virtual resource management table, numeral 11 designates a lexical analysis section, numeral 12 a name parsing section, numeral 13 a procedure selection section, numeral 14 a resource management table, numeral 15 a procedure management table, and numeral 16 designates a token type table. In this embodiment, the name resolution section 2 has the lexical analysis section 11, the name parsing section 12 and the procedure selection section 13. Also as the virtual resource management table 4, the two tables, the resource management table 14 and the procedure management table 15 are provided separately. Besides these, the name resolution section 2 holds and manages the token type table 16.

The lexical analysis section 11 delimits a token from the character string constituting the given name based on the procedure management table 15 and delimiter information (not shown), and registers the token to the token type table 16. Information indicating breakpoint of the token existing in the character string of the name is given as delimiter information.

The name parsing section 12 searches types regarding respective tokens delimited in the lexical analysis section 11, registers the types in the token type table 16, checks the priority of respective keywords and makes syntax tree and delivers this to the procedure selection section 13.

Figures 7, 8, 9:
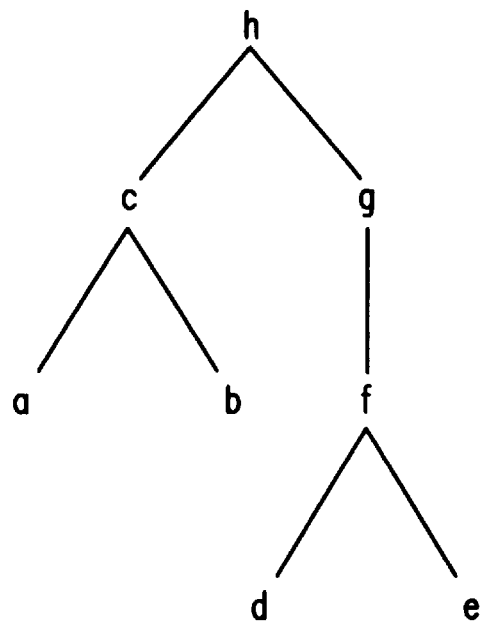
FIG. 7 is an explanation diagram of tree.
FIG. 8 is an explanation diagram of configuration of a resource management table.
FIG. 9 is an explanation diagram of configuration of a procedure management table.

FIG. 7 is an explanation diagram of tree. In following description, tree of father p having sons cl, . . . , cn is expressed by {p cl . . . cn}. For example, the tree shown in FIG. 7 is expressed by "(h (c a b)) (g (f d e))." In FIG. 7, a, b, d and e are leaves, and c, f, g and h are nodes. The name parsing section 12 prepares syntax tree having tokens as leaves.

Regarding tokens registered as names in the token type table 16, the procedure selection section 13 searches position of a resource from the resource management table 14, selects procedure obtained from the syntax tree and the procedure management table 15 and outputs the position of the resource and the procedure.

The resource management table 14 is constituted of a pair of a name and position of an actual resource in similar manner to a resource management table in the prior art. FIG. 8 is an explanation diagram of configuration of the resource management table. In FIG. 8, NAME1, NAME2 and NAME3 represent names, and ATTR1, ATTR2 and ATTR3 represent positions of resources corresponding to the NAME1, NAME2 and NAME3 respectively. The resource management table 14 is held and managed by the name resolution section 2.

The procedure management table 15 is a table used when the name parsing section 12 carries out syntactic analysis. FIG. 9 is an explanation diagram of configuration of the procedure management table. An example of configuration of the procedure management table 15 shown in FIG. 9 comprises an operator name such as a keyword appearing in a name, type of the operator, the priority and procedure selection rule. In FIG. 9, RT1, RT2 and RT3 represent operator names, TY1, TY2 and TY3 represent types of the operators, PR1, PR2 and PR3 represent the priority, and RV1, RV2 and RV3 represent the procedure selection rule, respectively.

The token type table 16 is a table which is registered in the lexical analysis section 11 and the name parsing section 12 and is used as reference in the procedure selection section 13. The token type table 16 is an empty table when a name is delivered to the name resolution section 2. A token delimited in the lexical analysis section 11 and type in correspondence in the name parsing section 12 are stored in the token type table 16.

Figure 10:
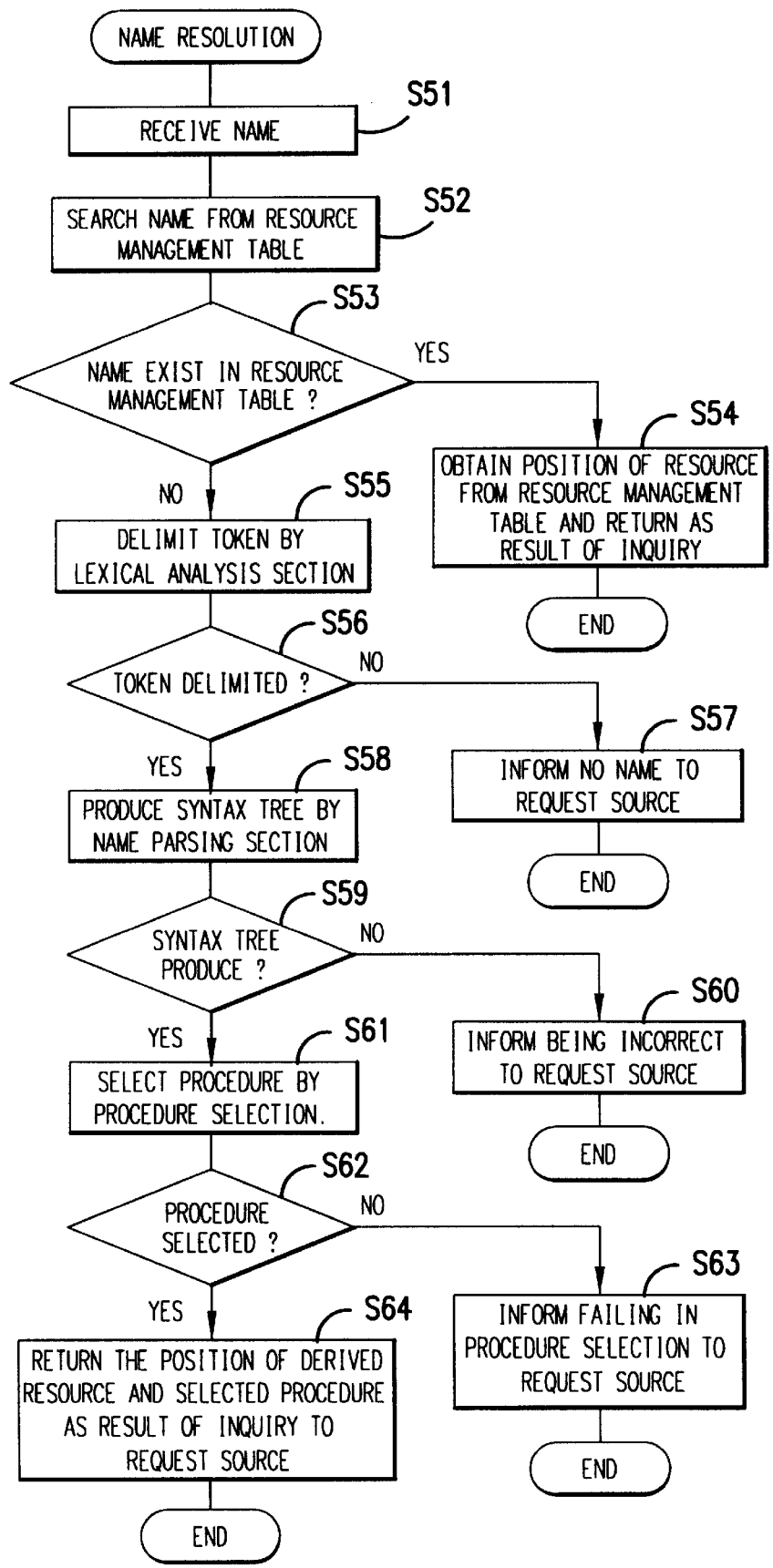
FIG. 10 is a flow chart explaining an example of operation of a name resolution section.

An example of operation in the fifth embodiment of the name service apparatus of the present invention will be described. FIG. 10 is a flow chart explaining an example of operation of the name resolution section 2. When the name given as input is not written in the resource management table 14, the name resolution section 2 divides the given name into tokens by the lexical analysis section 11, then analyzes the character string in the name parsing section 12 using the procedure management table 15 and delivers the analysis result to the procedure selection section 13. In the procedure selection section 13, the position of a resource and the procedure are obtained based on the analysis result.

First, in S51, a name is received. In S52, the received name is searched from the resource management table 14. Then, in S53, decision is effected regarding whether the name exists in the resource management table 14 or not. If the name exists in the resource management table 14, in S54, the position of the resource is obtained from the resource management table 14 and returned as the result of inquiry and the processing is finished.

In S53, if the received name does not exist in the resource management table 14, in S55, a token is delimited from the received name by the lexical analysis section 11. Then in S56, decision is effected regarding whether the token can be delimited or not. If the token cannot be delimited, in S57, the request source is informed of that the corresponding name does not exist, and the processing is finished.

When the lexical analysis section 55 can delimit the token in S55, process is advanced from S56 to S58 and the syntax tree is prepared by the name parsing section 12. Then in S59, decision is effected regarding whether the syntax tree can be formed or not. If the syntax tree cannot be formed, in S60, the request source is informed of that the name is incorrect, and the processing is finished.

When the syntax tree can be formed in S58, process is advanced from S59 to S61, the procedure is selected by the procedure selection section 13. Then in S62, decision is effected regarding whether the procedure can be selected or not. If the procedure cannot be selected, in S63, the request source is informed of failing in selection of the procedure, and the processing is finished.

When the procedure can be selected in S61, process is advanced from S62 to S64, and the position of the derived resource and the selected procedure are returned as the result of inquiry to the request source.

Figure 11:
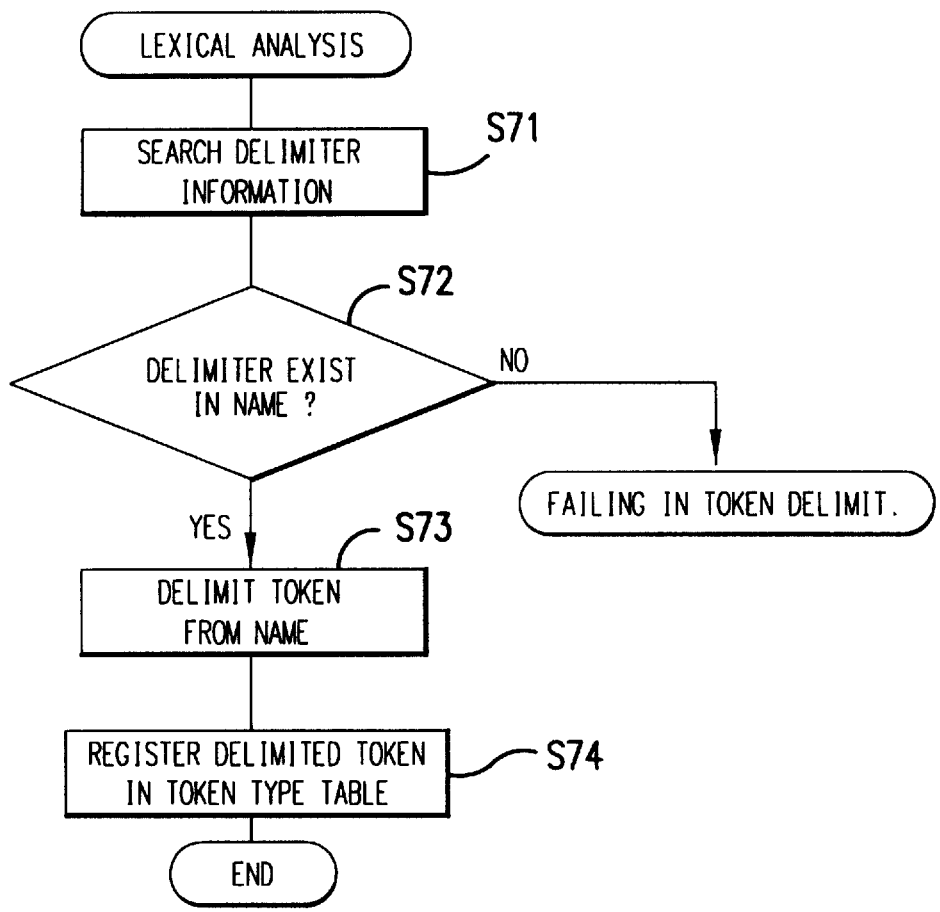
FIG. 11 is a flow chart explaining an example of operation of a lexical analysis section.

Next, among flow of the processing shown in FIG. 10, the delimiting processing by the lexical analysis section 11 carried out in S55 will be described. FIG. 11 is a flow chart explaining an example of operation of the lexical analysis section 11. As above described, the lexical analysis section 11 delimits a token from the character string constituting the given name using the procedure management table 15 and the delimiter information, and then registers the token in the token type table 16.

In S71, at first, the delimiter information is obtained, and it is searched whether the delimiter exists or not in the character string constituting the name. In S72, decision is effected regarding whether the delimiter exists or not. If the delimiter does not exist, the delimiting of the token ends in a failure and the processing is finished. When the delimiter exists, in S73, the character string partitioned by the delimiter is made a token and the token is delimited. In S74, the delimited token is registered in the token type table 16 and the processing is finished.

Figure 12:
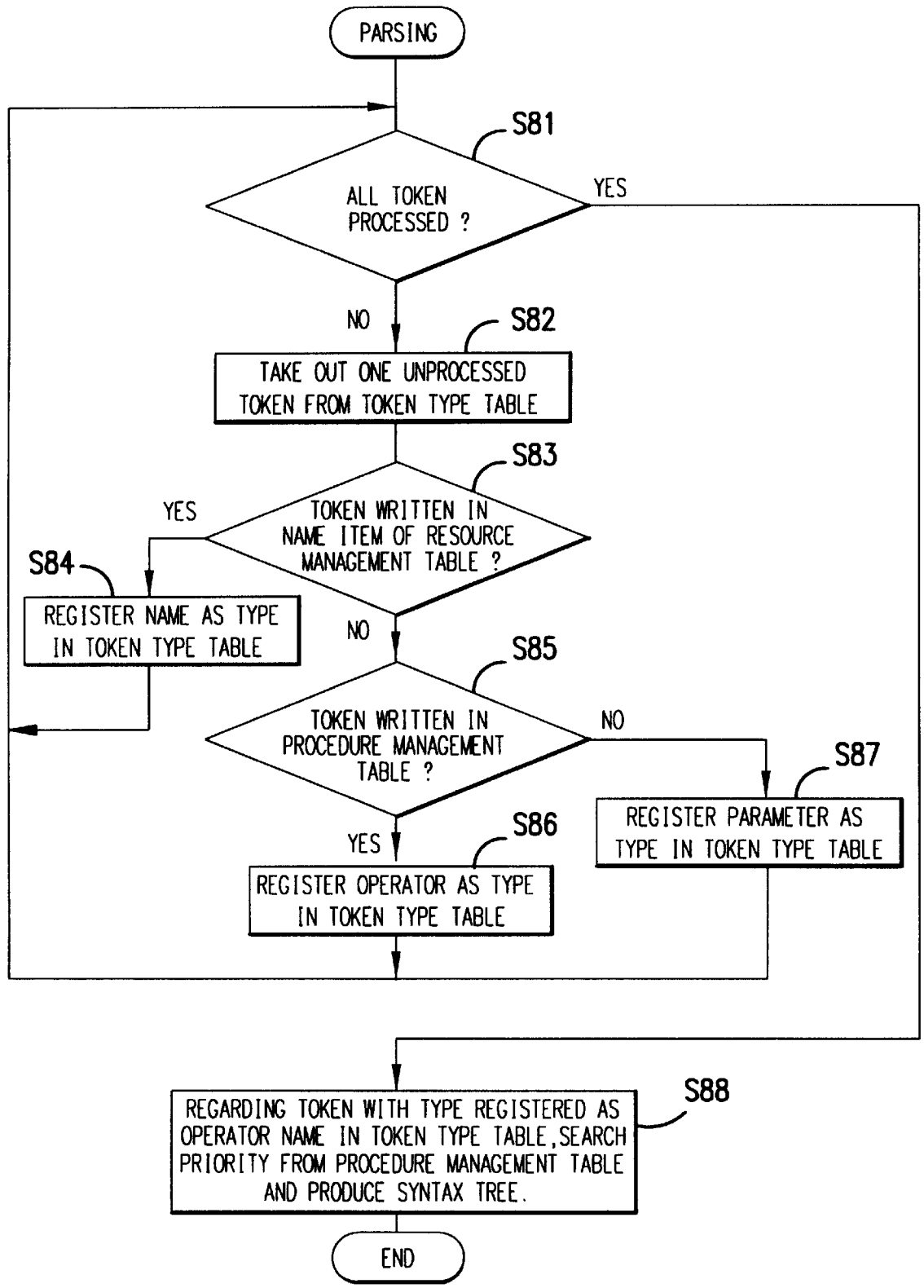
FIG. 12 is a flow chart explaining an example of operation of a name parsing section.

Next, among flow of the processing shown in FIG. 10, processing of forming the syntax tree by the name parsing section 12 carried out in S58 will be described. FIG. 12 is a flow chart explaining an example of operation of the name parsing section 12. As above described, the name parsing section 12 searches type regarding respective tokens delimit by the lexical analysis section 11, registers the type in the token type table 16, searches the priority of respective keywords from the procedure management table 15 and forms the syntax tree and delivers this to the procedure selection section 13.

At first, in S81, decision is effected regarding whether all tokens are processed or not. If any token is not processed, in S82, one token not being processed is taken out from the token type table 16. The resource management table 14 is retrieved based on the token taken out, and in S83, decision is effected regarding whether the token taken out is written or not as item of name of the resource management table 14. When the token is written in the resource management table 14, in S84, the type corresponding to the token is registered as "name" in the token type table 14. Then process is returned to S81, and processing regarding next token is continued.

In S83, if the token is not written in the resource management table 14, the procedure management table 15 is retrieved based on the token. In S85, decision is effected regarding whether the token is written in the procedure management table 15. If the token is written, in S86, the type corresponding to the token is registered as "operator name" in the token type table 16. If the token is not written in the procedure management table 15, in S87, the type corresponding to the token is registered as "parameter" in the token type table 16. In any case, process is returned to S81 and the processing regarding next token is continued.

When the processing regarding all tokens is finished in S81, in S88, regarding tokens registered as operator name in the token type table 16, the priority of respective tokens is searched from the procedure management table 15, the syntax tree is formed and the processing is finished.

Figures 13, 14, 15, 16, 17:
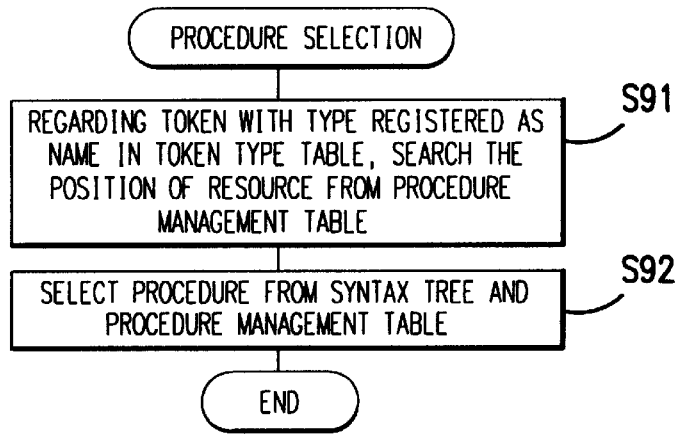
FIG. 13 is a flow chart explaining an example of operation of a procedure selection section.
FIG. 14 is an explanation diagram of an example of a delimiter information table.
FIG. 15 is an explanation diagram of an example of a resource management table.
FIG. 16 is an explanation diagram of an example of a procedure management table.
FIG. 17 is an explanation diagram of an example of a token type table.

Next, among flow of the processing shown in FIG. 10, the selecting processing of the procedure by the procedure selection section 13 carried out in S61 will be described. FIG. 13 is a flow chart explaining an example of operation of the procedure selection section 13. As above described, regarding tokens with type registered as "name" in the token type table 16, the procedure selection section 13 searches position of a resource from the resource management table 14, and selects a procedure from the syntax tree formed in the name parsing section 12 and the procedure management table 15.

At first, in S91, tokens with type registered as "name" in the token type table 16 are taken out, the resource management table 14 is retrieved regarding the tokens and the position of the corresponding resource is obtained. Subsequently in S92, the procedure management table 15 is retrieved based on the syntax tree formed in the name parsing section 12, and the procedure is obtained. The position of the resource and the selected procedure obtained in such manner are returned as the result of the name resolution in the name resolution section 2 to the request source.

The name resolution is carried out using the result of the parsing in such manner, thereby when the name of a virtual resource is inputted, for example, parameter and procedure to be selected and further necessary resource name or the like can be commanded. Thereby when the user carries out access to the virtual resource, the flexibility can be improved.

An example of operation of the fifth embodiment will be described based on a specific example. For example, a name is transmitted from a virtual resource realization section (not shown) or the like to the name resolution section 2. Here, the description will be carried out in the case that the name of "image1. scale. 2" being name of a virtual file obtained by enlarging an image file of "image1" in two times is transmitted.

FIG. 14 is an explanation diagram of an example of a delimiter information table, FIG. 15 is an explanation diagram of an example of a resource management table 14, FIG. 16 is an explanation diagram of an example of a procedure management table 15, and FIG. 17 is an explanation diagram of an example of a token type table 16. The delimiter information table, the resource management table 14 and the procedure management table 15 are previously set. In the delimiter information table, "." is registered as delimiter as shown in FIG. 14. Also in the resource management table 14, a position "location1" is registered corresponding to a name "image1" and a position "location2" is registered corresponding to a name "image2" as shown in FIG. 15. Further in the procedure management table 15, operators "scale" and "Z" are registered as shown in FIG. 16. The operator "scale" is a binary operator, so "x. scale. y" is registered as type. This "x. scale. y" specifies "scale" must have two arguments as the type of operater. The priority is "2" which means the highest priority and the procedure is "pnmscale" with two arguments. Also the operator "Z" is a unary operator, so "x. Z" is registered as type. This "x. Z" specifies "Z" must have one arguments as the type of operator. The priority is "1" which means the lowest priority, and "compress" is registered as procedure. This procedure has one argument. Also the token type table 16 is an empty table in the initial state.

The name "image1. scale. 2" is transmitted from the virtual resource realization section, and when the name resolution section 2 receives this name, at first, it is searched whether the name "image1. scale. 2" exists in the resource management table 14 or not. Since the name "image1. scale. 2" does not exist in the resource management table 14 shown in FIG. 15, it is delivered to the lexical analysis section 11.

The lexical analysis section 11 searches the delimiter information table. In the delimiter information table, "." is stored as delimiter as shown in FIG. 14. The lexical analysis section 11 obtains "." as delimiter. By the obtained delimiter ".", tokens "image1", "scale", "2" are delimited from the name "image1. scale. 2." The delimited tokens are registered in the token type table 16 and delivered to the name parsing section 12. In this time point, in the token type table 16, a field of token only is registered among the table shown in FIG. 17. A field of TYPE remains undefined.

The name parsing section 12 takes out the first token "image1" from the token type table 16, and it is searched whether the token "image1" is written in the item of the name in the resource management table 14 or not. Since the token "image1" is written in the resource management table 14 shown in FIG. 15, type corresponding to the token "image1" is registered as "name" in the field of TYPE of the token type table 16.

Next, the second token "scale" is taken out from the token type table 16, and it is searched whether the token "scale" is written in the item of the name in the resource management table 14 or not. Since the token "scale" is not written in the resource management table 14 shown in FIG. 15, it is further searched whether the token "scale" is written in the procedure management table 15 or not. Since the token "scale" is written in the procedure management table 15 shown in FIG. 16, type corresponding to the token "scale" is registered as "operator" in the field of TYPE in the token type table 16.

Next, the third token "2" is taken out from the token type table 16, and it is searched whether the token "2" is written in the item of the name in the resource management table 14 or not. Since the token "2" is not written in the resource management table 14 shown in FIG. 15, it is further searched whether the token "2" is written in the procedure management table 15 or not. Since the token "2" is not written also in the procedure management table 15 shown in FIG. 16, type corresponding to the token "2" is registered as "parameter" in the field of TYPE in the token type table 16.

Thus regarding all tokens, the type is searched and registered in the token type table. FIG. 17 shows the token type table completed in such manner.

The name parsing section 12 forms the syntax tree from the token type table shown in FIG. 17 and the procedure management table shown in FIG. 16. As method of forming the syntax tree, the parsing method such as the operator order parsing (Addison Wesley Pub, Comp., A. V. Aho, R. Sethi, J. D. Ullman, Compilers, p. 203–266) can be used. By the parsing, the syntax tree "(scale image1 2)" is formed and delivered to the procedure selection section 13.

The procedure selection section 13 takes out the token with TYPE registered as "name" in the token type table 16. Here, the token "image1" is taken out. Regarding the token "image1", the position "location1" of a resource is obtained from the resource management table 14. Further, the procedure management table 15 is referred to based on the node "scale" of the syntax tree "(scale image1 2)", and the procedure "pnmscale (y, x)" is obtained. Sons "image1" and "2" of father "scale" of the syntax tree are in correspondence respectively to x, y, and further the "image1" is replaced by the position "location1" of the resource obtained from the resource control table 14, thereby the procedure "pnmscale (2, location1)" is obtained. The position "location1" of the resource and the procedure "pnmscale (2, location1)" obtained in such manner are transmitted to the virtual resource realization section.

When the virtual resource realization section receives the position "location1" of the resource and selected procedure "pnmscale (2, image1)" corresponding to the name "image. scale. 2," for the resource "image1" existing in the location1, the procedure "primscale" is file of enlarging "image1" in two times can be obtained.

FIG. 18 is an explanation diagram of a specific example of a name to be inputted, syntax tree to be formed and procedure to be selected, and FIG. 19 is an explanation diagram of another example of the procedure management table 15. As shown in FIG. 18(A), according to the processing as above described, the syntax tree "(scale image1 2)" is produced from the name "image1. scale. 2," and the procedure "pnmscale (2, image1)" is returned. In FIGS. 18 (B) to (D), several other examples are shown. In similar manner, the processing is carried out and the syntax tree is produced and the procedure is selected respectively. The procedure management table 15 used in these examples is shown in FIG. 19. In FIG. 19, the priority is undefined.

In an example shown in FIG. 18(B), the name "image1. scale. 2. tiff. Z" is given. In the lexical analysis section 11, tokens "image1", "scale", "2", "tiff" and "Z" are delimited, and in the name parsing section 12, the syntax tree "(Z (tiff (scale image1 2)" is produced. In the procedure selection section 13, the procedure is selected from the syntax tree and the procedure management table 15 shown in FIG. 19. Part of "(scale image1 2)" is similar to that in FIG. 18(A). From part "(tiff (scale image1 2))," "pnmtotiff (pnmscale (2, image1))" is obtained, and the procedure "compress (pnmtotiff (pnmscale (2, image1)))" as a whole is obtained.

In an example shown in FIG. 18(C), the name "image1. scale. 2. Z" is given. In the lexical analysis section 11, tokens "image1", "scale", "2" and "Z" are delimited, and in the name parsing section 12, the syntax tree "(Z (scale image1 2))" is produced. Based on this, in the procedure selection section 13, the procedure "pnmscale (2, image1)" is obtained from the partial tree "(scale image1 2)" in similar manner to FIG. 18(A), and the procedure "compress (pnmscale (2, image1))" as a whole is obtained.

In an example shown in FIG. 18(D), the name "(pnmfile1. pnmscale. 2). add. pnmfile2" is given. In the lexical analysis section 11, tokens "pnmfile1", "pnmscale", "2", "add" and "pnmfile2" are delimited, and in the name parsing section 12, the syntax tree "(add (pnmscale pnmfile1 2) pnmfile2)" is produced. In the procedure selection section 13, the procedure "pnmscale (2, pnmfile1)" is obtained from the sub tree "(pnmscale pnmfile1 2)", and then the procedure "pnmarith (-add, pnmscale (2, pnmfile1), pnmfile2)" as a whole is obtained.

Thus the processing corresponding to the given name can be obtained. Then the given names are virtual resources obtained by applying the procedure to the actual resource. The resources of these names need not exist actually. These names may be designated by other names, or as in the above-mentioned second embodiment, such configuration is possible that these names can be obtained by applying some procedure.

Figure 20:
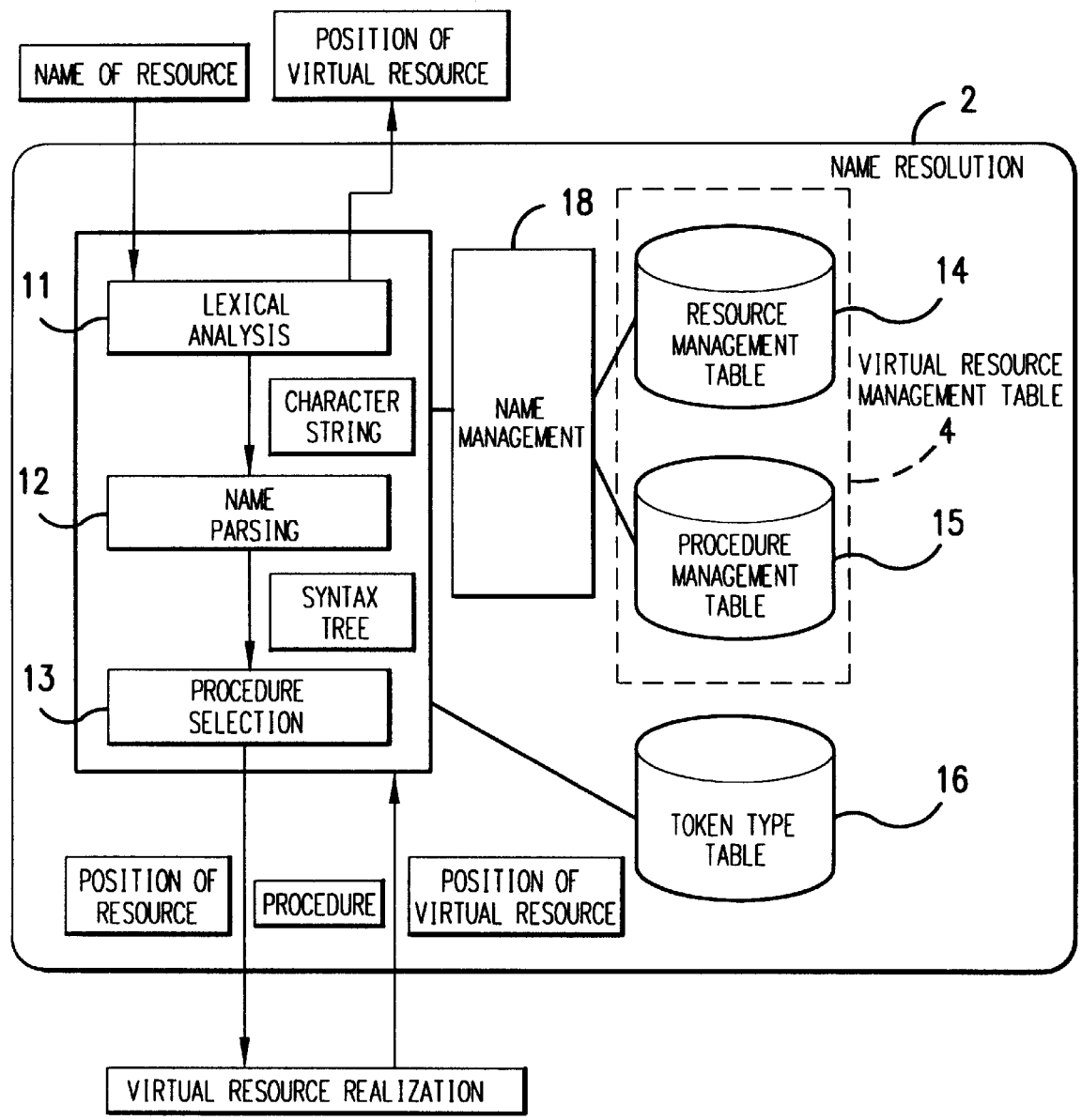
FIG. 20 is a block diagram showing a sixth embodiment of a name service apparatus of the invention.

FIG. 20 is a block diagram showing a sixth embodiment of a name service apparatus of the present invention. In FIG. 20, similar parts to those in FIG, 6 are designated by the same reference numerals and the description shall be omitted. Numeral 17 designates a virtual resource realization section, and numeral 18 designates a name management section. In this embodiment, the name service apparatus is provided with the name resolution section 2 and the virtual resource realization section 17. The virtual resource realization section 17 can produce entity of a virtual resource and carry out normal access.

Here, realization of a virtual resource will be described using an example explained in the first embodiment. For example, reserving service is made a resource so that a specific time is assigned and a meeting room is reserved and a reserving state can be inquired. Then as a virtual resource, a reserving file showing a reserving state of an assigned time as the time table can be made. Procedure of inquiring the reserving state is executed in the reserving service, thereby the reserving file being a virtual resource can be prepared. Thereby the reserving file being a virtual resource can be realized.

When a result of transforming processing to a file is outputted to the file, the first file is an actual resource and the file of an output result is a virtual resource being realized. When the resource is made a file in such manner, procedure of transforming processing is applied to the actual file thereby the realized virtual resource can be obtained.

Further, a system will be considered in that when name is assigned in "a printer not being outputting" as output destination, a printer not being outputting is searched among printers which can be used, and outputting to the printer is carried out. Resources in this case are respective printers, and the virtual resource is a printer with name corresponds to "a printer not being outputting." In this case, a printer not being outputting is selected among printers which can be used, thereby the virtual resource can be realized.

In any case, a resource corresponding to a virtual resource does not exist before the virtual resource is realized.

However, according to processing of realization, the virtual resource is produced and becomes an actual resource. The sixth embodiment is different from each of the preceding embodiments in that processing is executed to the actual resource, the virtual resource is realized and access to the virtual resource is carried out.

The virtual resource realization section 17 receives the position of the resource outputted from the name resolution section 2 and the procedure to be applied to the resource, and applies the procedure to the resource at the position and produces the resource obtained as the result. Then the position of the produced resource is returned. For example, when the resource is a file, the procedure is applied to data within the file, then the space enclosing the file is secured on the network, the procedure is applied to the secured space, the produced data are stored as the file and the position of the file is returned as the result. Since the virtual resource realization section 17 secures a space where produced resources are stored, a communication processing unit (not shown) is provided for communication with a resource storage apparatus. In addition, the resource storage apparatus (not shown) carries out read/write of the resource information, and returns the position of the resource when the reading is carried out. Also when the position is given, the resource corresponding to this is returned.

The virtual resource realization section 17 may be operated by a host other than the host where the name service operates. In this case, execution of the procedure may be realized by remote operation. Also when the resource is a file, the resource storage apparatus (not shown) may be realized using a file system of distributed operating system. Also the resource by realization of the virtual resource may be managed as being cached.

The name management section 18 holds and manages the resource management table 14 and the procedure management table 15, and deals with request for registration, updating, purge of virtual resource of the name. Also the name management section 18 responds to inquiry regarding the name information from the name resolution section 2. Also in the first to fifth embodiments as above described, function corresponding to the name management section 18 is provided, and in this embodiment, the name management section 18 is shown explicitly.

Although FIG. 20 shows configuration based on the fifth embodiment as above described, the configuration is not limited to this but may be based on the first to fourth embodiments.

Figure 21:
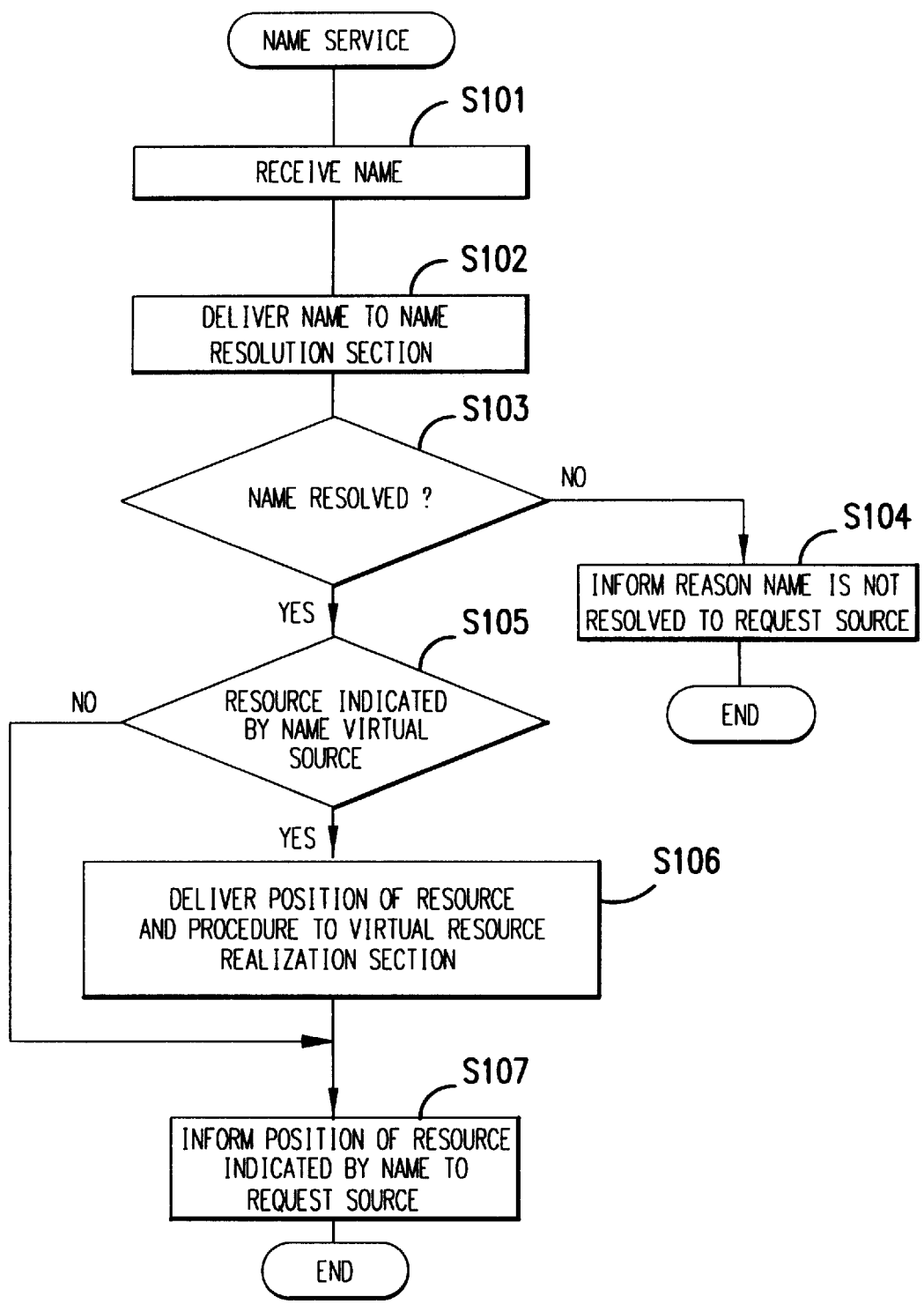
FIG. 21 is a flow chart explaining an example of operation in the sixth embodiment of the invention.

An example of operation in the sixth embodiment of the name service apparatus of the present invention will be described as follows. FIG. 21 is a flow chart explaining an example of operation in the sixth embodiment of the present invention. In the name service apparatus of the sixth embodiment, at first, in S101, a name is received in response to request for name resolution from the outside. In S102, the received name is delivered to the name resolution section 2. The name resolution section 2 resolves the delivered name. Then in S103, decision is effected regarding whether the name can be resolved or not. If the name cannot be resolved, reason why the name obtained from the name resolution section 2 cannot be resolved is returned to the request source, and the processing is finished.

If the name is resolved in the name resolution section 2, in S105, decision is effected regarding whether the resource indicated by the name is a virtual resource or not. If it is a name of an actual resource, in S107, the position of the resource indicated by the name is returned to the request source. If the resource indicated by the name is a virtual resource, in S106, the virtual resource is realized in the virtual resource realization section 17, and the realized resource is stored in the resource storage apparatus and the stored position is obtained. In S107, the position of the realized virtual resource is returned to the request source.

Since operation of the name resolution section 2 is similar to that in the fifth embodiment, the detailed description of operation shall be omitted here. The name resolution section 2 outputs the position of the actual resource and the applied procedure, and these are inputted to the virtual resource realization section 17.

Figure 22:
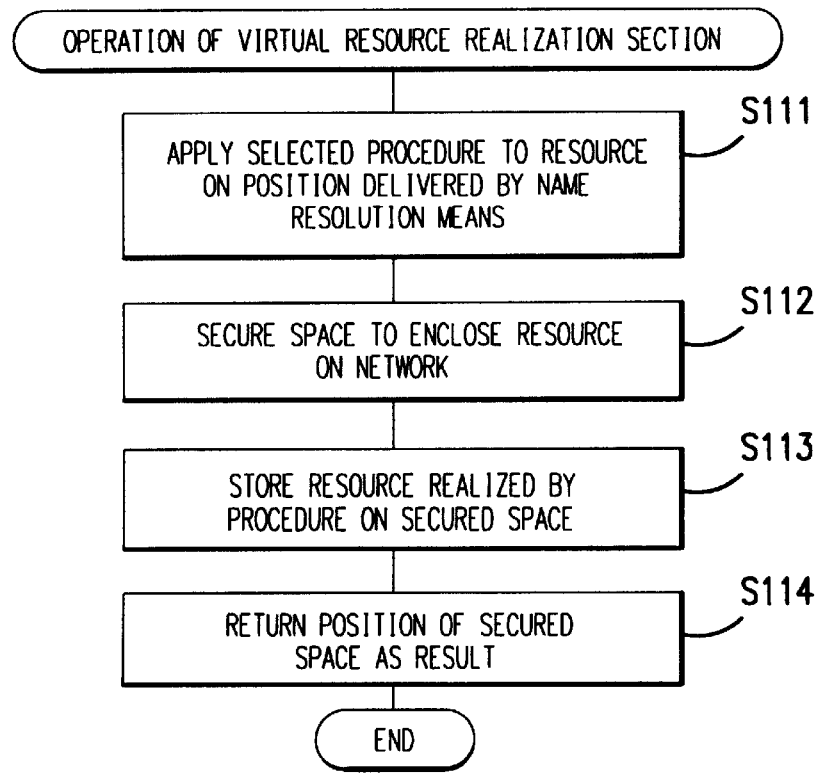
FIG. 22 is a flow chart explaining an example of operation of a virtual resource realizing section.

FIG. 22 is a flow chart explaining an example of operation of the virtual resource realization section 17. When the position of the actual resource and the applied procedure outputted from the name resolution section 2 are received, in S111, the received procedure is applied to the resource existing in the received position, and the virtual resource is realized. On the other hand, in S112, the space for enclosing the resource realized on the network is secured. In S113, the resource realized in S111 is stored in the space secured in S112. Finally in S114, the position of the space secured in S112 is returned as the result to the request source. In the request source, access is carried out based on the obtained position thereby access to the virtual resource can be realized.

Next, an example of specific operation in the sixth embodiment will be described. Here, description is carried out in the case that the name "image1. scale. 2" being a name of a file by enlarging the image file "image1" in two times is received. When the requested name "image. scale. 2" is received, the name is delivered to the name resolution section 2. When the name resolution section 2 receives the name "image1. scale. 2", the position of the actual resource and the selected procedure are outputted as described in the fifth embodiment. For example, "location1" is outputted as the position of the actual resource, and "pnmscale (2, image1)" is outputted as the selected procedure respectively.

The name resolved in the name resolution section 2 indicates a virtual resource. Therefore the position of the resource and the selected position outputted from the name resolution section 2 are delivered to the virtual resource realization section 17.

When the virtual resource realization section 17 receives the position "location1" of the resource and selected procedure "pnmscale (2, image1)" corresponding to the name "image1. scale. 2," the procedure "pnmscale" is executed in parameter 2 to the resource "image1" existing in "location1." As a result, the image file by enlarging image1 in two times is obtained. The space for enclosing the image file by enlarging image1 in two times is secured in the resource storage apparatus (not shown), and the image file is stored in the secured space. The position of the resource corresponding to the virtual resource outputted from the virtual resource realization section 17 is returned as the result of inquiry to the request source.

Next, a seventh embodiment of the present invention will be described. When a part of system connected by a network may be used in disconnected state, the seventh embodiment shows configuration to provide the good environment, in the case that a resource is used in disconnected state and in the case that it is used in connected state to the system.

For example, a schedule management file will be considered. Within an office, management of schedule is carried out by system of desk top type which is always connected to a network. Also outside the office, a schedule management file may be transferred to a portable system and reference of schedule may be done. Resource such as a file may be commonly shared between a system always connected to the network and a system which may be disconnected from the system. When a file is commonly shared between a desk top system connected by the network and a portable system, in order that the portable system even in disconnected state from the network can make access to the file commonly shared, copy of the file commonly shared must be provided also on the portable system.

In this case, a problem may be produced when additional changing is newly carried out either in the original file on the desk top system or in the copy file on the portable system. In such a case, similar additional changing must be newly carried out also in another file, or synchronization to keep consistency between files becomes necessary so that the file in additional changing is aaplied to another file.

As that realizing synchronization between files in such manner, there is rdist being one of tools of the UNIX operating system. In this system, regarding files under source directory and target directory assigned, the changing time is compared, and copy is carried out under the target directory regarding the file newly added or changed under the source directory. Thereby synchronization is provided in one directory from the source directory to the target directory.

Also as application for Macintosh (trade mark) of Apple Computer, Inc., there is file synchronizing software such as "Magnet" (No Hands Software Company) (commodity name), "PowerMarge" (K. K. Seiwa Systems) (commodity name), "Zync" (program name) or the like. In such system, synchronization of data is carried out between two files or file groups on different systems previously assigned.

Since the portable system is utilized in disconnected state from the network, when changing is made for the file, the immediate synchronization cannot be always carried out. Therefore application to carry out synchronization at regular intervals is started and resource such as file is synchronized, or when the portable system is connected to the network or before access to the common file is carried out, the user starts the application of synchronization by manual operation.

However, when the application to carry out synchronization at regular intervals is started, although the portable system is connected to the network, since the time does not satisfy the regular intervals, access may be carried out to the file on the portable system having content different from the up-to-date original file on the home position. Also when the user starts the application of synchronization after the portable system is connected to the network, access to the file may be carried out forgetting this operation. Also the application of synchronization must be started after confirming whether connection to the network is carried out or not. Further since a file other than the file to be accessed is also synchronized at the same time, when there are many files to synchronize, the user must wait for accessing to the file until all synchronization finish.

The present invention can deal with such problem of synchronization. The seventh embodiment of the present invention shows an embodiment to resolve the problem.

Figure 23:
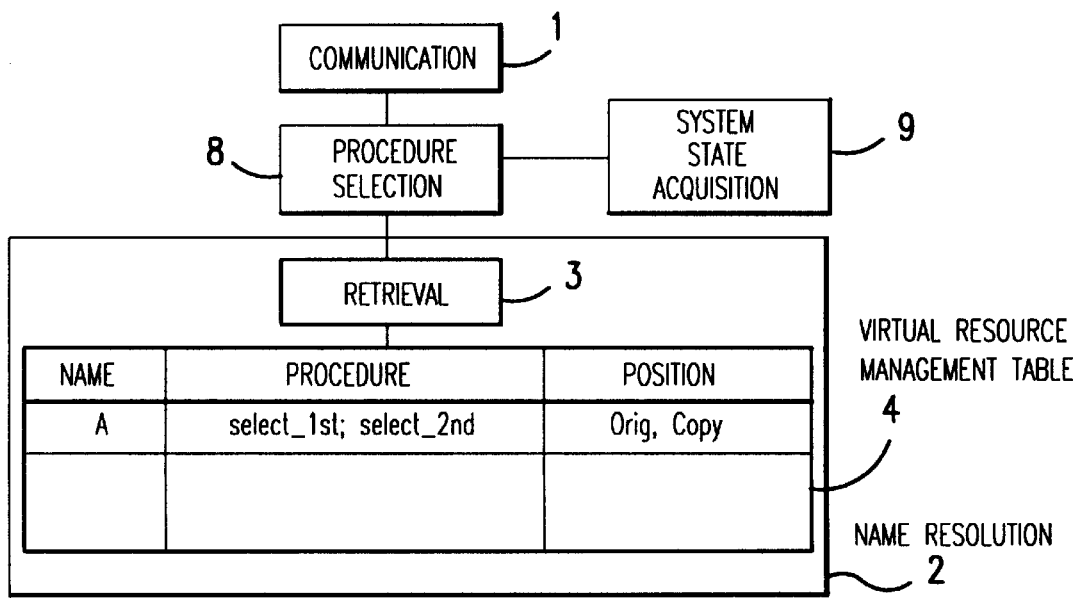
FIG. 23 is a block diagram showing a seventh embodiment of a name service apparatus of the invention.

FIG. 23 is a block diagram showing the seventh embodiment of a name service apparatus of the present invention. Reference numerals in FIG. 23 are similar to those in FIG. 4. Configuration shown in FIG. 23 is basically similar to that of the third embodiment of the present invention shown in FIG. 4, and information stored in the virtual resource management table is changed.

In the example shown in FIG. 23, corresponding to the name A, two procedures of "select_1st" and "select_2nd" and the positions of two actual resources "Orig" and "Copy" are registered. The procedure "select_1st" is a procedure of selecting the first position, and the procedure "select_2nd" is a procedure of selecting the second position.

The procedure selection section 8 selects a procedure among procedures previously determined in accordance with parameter obtained from the system state acquisition section 9. In this example, either the first procedure "select_1st" or the second procedure "select_2nd" is selected, and either <A, select_1st, (Orig, Copy)> or <A, select_2nd, (Orig, Copy)> is returned to the communication section 1. When the procedure "select_1st" is selected, "Orig" is selected among (Orig, Copy). Also when the procedure "select_2nd" is selected, "Copy" is selected.

An example of operation in the seventh embodiment of the present invention will be described based on a specific example. Here, an example of operation is shown when inquiry for the name A is carried out to the communication section 1. On receiving the inquiry request for the name "A", the communication section 1 requests the procedure selection section 8 to carry out the name resolution corresponding to the name "A". The procedure selection section 8 requests the retrieval section 3 to retrieve the virtual resource management table 4 using the name "A" as a key. The retrieval section 3 retrieves the virtual resource management table 4, and returns a tuple of three items <A, (select_1st, select_2nd), (Orig, Copy)> having the name "A" as a key.

The procedure selection section 8 carries out inquiry to the system state acquisition section 9, and receives, for example, parameter showing whether the portable system is connected or not. When the portable system is connected, the first procedure "select_1st" is selected, and a tuple of three items <A, select_1st, (Orig, Copy)> is returned. When the portable system is not connected, the second procedure "select_2nd" is selected, and a tuple of three items <A, select_2nd, (Orig, Copy)> is returned to the communication section 1. Here, the parameter in the case of the portable system being connected is received. In this case, a tuple of three items <A, select_2nd, (Orig, Copy)> is returned to the communication section 1. The communication section 1 carries out communication using "Orig, Copy" and "select_2nd" as answer.

In the request source, only the virtual name "A" is used, and automatic changing is made so that when the portable system is connected to the network, resource in the position "Orig" is used, and when the portable system is not connected, resource in the position "Copy" is used. Thus according to the seventh embodiment, for the inquiry of the virtual name, depending on the state whether the system is connected to the network or not, suitable procedure and position of the resource are returned and the access of the user to the suitable resource always becomes possible.

Figure 24:
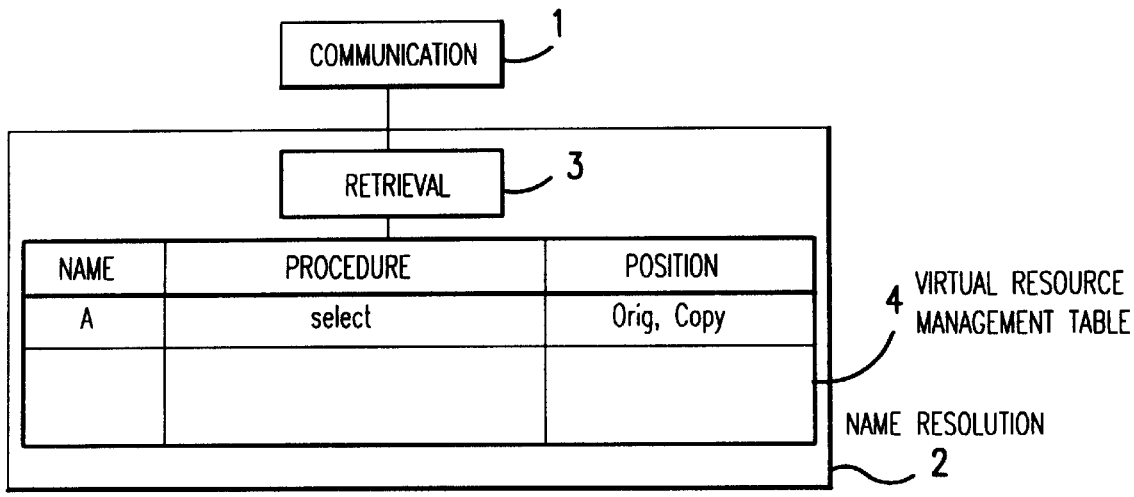
FIG. 24 is a block diagram showing a modification in the seventh embodiment of the name service apparatus of the invention.

FIG. 24 is a block diagram showing a modification in the seventh embodiment of the name service apparatus of the present invention. This example shows the case that configuration of the first embodiment is used. In this case, in the virtual resource management table 4, as shown in FIG. 24, in response to the name "A", procedure "select" of selecting, for example, the first position when the portable system is connected, and the second position when it is not connected, and the positions "Orig" and "Copy" of the two resources are registered.

On receiving the inquiry request for the name "A", the communication section 1 requests the retrieval section 3 to carry out the name resolution corresponding to the name "A". The retrieval section 3 retrieves the virtual resource management table 4, and returns a tuple of three items <A, select, (Orig, Copy)> having the name "A" as a key. The communication section 1 carries out communication using the positions of the resources "Orig, Copy" and the procedure "select" as answer. In the request source, the procedure "select" is executed thereby either the resource in the position "Orig" or the resource in the position "Copy" can be used selectively. The selection is carried out automatically by processing of the procedure "select". Or the procedure "select" may be provided with processing of inquiry for selection of the resource to the user.

Figure 25:
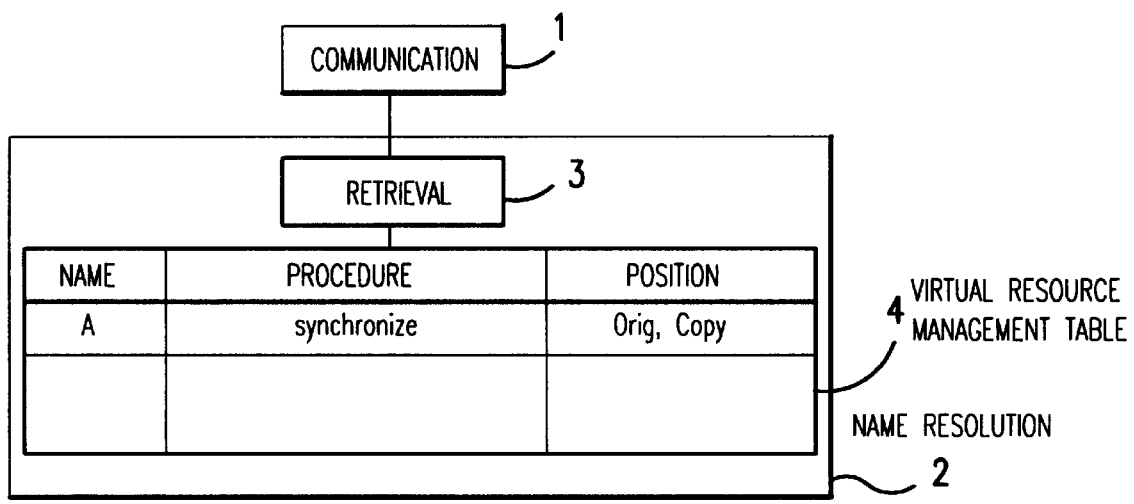
FIG. 25 is a block diagram showing another modification in the seventh embodiment of the name service apparatus of the invention.

FIG. 25 is a block diagram showing another modification in the seventh embodiment of the name service apparatus of the present invention. In this example, when the system in disconnected state is connected again, the access is carried out in coincidence of the resource. Configuration of this example is the same as that shown in FIG. 24, but different in the procedure registered in the virtual resource management table 4. In the virtual resource management table 4, corresponding to the name "A", the two positions "Orig" and "Copy" and the procedure "synchronize" for coincidence of the content of the files in the two positions are registered.

On receiving the inquiry request for the name "A", the communication section 1 requests the retrieval section 3 to carry out the name resolution corresponding to the name "A". The retrieval section 3 retrieves the virtual resource management table 4, and returns a tuple of three items <A, synchronize, (Orig, Copy)> having the name "A" as a key. The communication section 1 carries out communication using the positions of the resources "Orig, Copy" and the procedure "synchronize" as answer. In the request source, the procedure "synchronize" is executed thereby contents of the resource in the position "Orig" and the resource in the position "Copy" are coincident. Thereby, for example, while the portable system is used in disconnected state, the resource is changed, when the system is connected afterwards, this procedure is executed and the contents is made coincident. Then the user need not search the resource for equalization, and the procedure can be executed only by the virtual name.

Further, as the procedure to be executed, the procedure used together with function of the above-mentioned procedure "select" and enabling access after equalizing processing when the resource is not coincident, can be registered in the virtual resource management table 4.

Thus in the seventh embodiment, the user need not be conscious of, for example, whether the portable system is connected to the network or not, but when the portable system is connected to the network, access to the resource such as the up-to-date original file is possible, and when the portable system is not connected to the network, access to the resource such as the file on the portable system is possible. Thus access to the resource such as suitable file is always possible. In the present invention, such function is realized in that resources of plural computer systems are made virtual.

Figure 26:
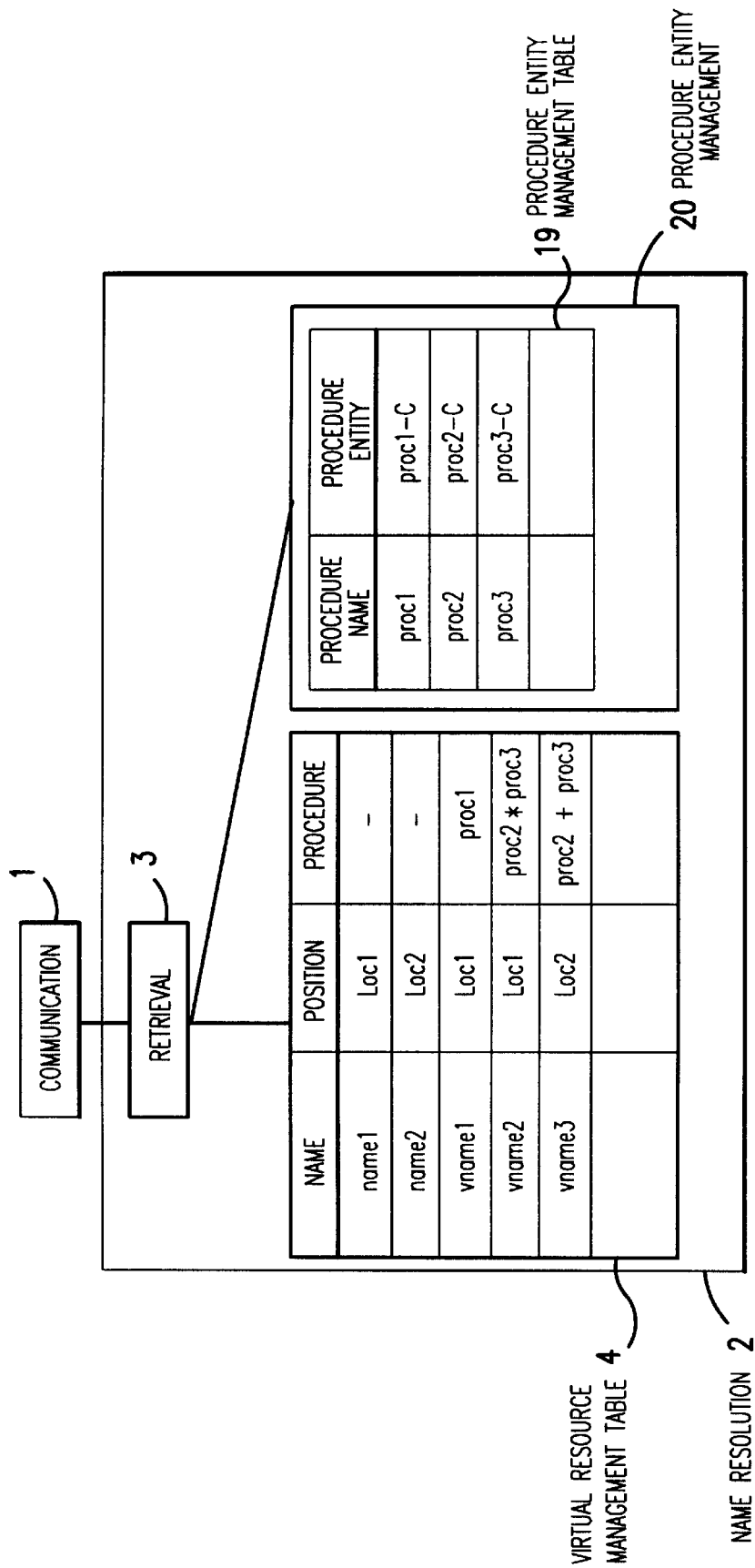
FIG. 26 is a block diagram showing an eighth embodiment of a name service apparatus of the invention.

FIG. 26 is a block diagram showing an eighth embodiment of a name service apparatus of the present invention. In FIG. 26, similar parts to those in FIGS. 1 and 4 are designated by the same reference numerals and the description shall be omitted. Numeral 19 designates a procedure entity management table, and numeral 20 designates a procedure entity management section. proc1-C, proc2-C and proc3-C are contents of procedures corresponding to proc1, proc2 and proc3 respectively. Entity of procedure is, for example, executable binary program, object of relocatable form before transformed to absolutely executable form, shell script or the like. In the eighth embodiment, the procedure entity management table 19 and the procedure entity management section 20 are added to configuration of the first embodiment, and entity of the procedure corresponding to the name of the procedure is outputted. Thereby operation to obtain entity of the procedure corresponding to the name of the procedure is not required, and the entity of the procedure is received from the name service thereby the procedure can be applied.

An example of operation in the eighth embodiment of the name service apparatus of the present invention will be described. As a specific example, operation of carrying out inquiry corresponding to vname1 to the communication section is shown. On receiving the inquiry request for vname1, the communication section 1 requests the retrieval section 3 of the name resolution section 2 to carry out the name resolution corresponding to vname1. The retrieval section 3 retrieves the virtual resource management table 4 using vname1 as a key. As a result of the retrieval, a tuple of three items <vname1, Loc1, proc1> is obtained. Since the third item is proc1, it is understood that the resource is a virtual resource. The retrieval section 3 requests the procedure entity management section 20 for the procedure entity corresponding to the procedure name proc1. The procedure entity management section 20 retrieves the procedure entity management table 19, and returns the procedure entity proc1-C corresponding to the procedure name proc1. The communication section 1 carries out communication using the position Loc1 of the actual resource, the procedure name proc1 and the procedure entity proc1-C as answer.

In this example, although the procedure entity management table 19 and the procedure entity management section 20 are added to the first embodiment, the procedure entity management table 19 and the procedure entity management section 20 may be added to configuration of the second to seventh embodiments.

The procedure entity management section 20 may carry out management in correspondence of one name to entity of plural procedures. Regarding which procedure should be selected, for example, parameter acquired by the system state acquisition section 9 shown in the third embodiment or data sent to the communication section may be selected, for example, by parameter separated by the procedure selection section 10 shown in the fourth embodiment. For example, in correspondence of the name of one procedure to plural types of programs, if a kind of CPU chip is given as parameter, the executable program by the computer can be outputted.

The name service apparatus of the present invention, as shown in FIG. 27, can be realized as a part of function of each computer system, in distributed environment where resources distributed and arranged on the network can be accessed and utilized from the computer system. Each computer system includes network communication section which performs delivery/reception of information with other computer system on the network and access to the memory holding resources, a CPU, a RAM, a secondary storage and the like. When instruction for access to resources is included as a part of the application program executed in the computer system, the name of the resource is delivered to the program module to resolve the name. If the program module for the name resolution is executed in the CPU, the position of the resource existing and the procedure name are returned to the application program. The application program executes the program indicated by the procedure name to the resource shown by the received position, and realizes the virtual resource. Processing of a part of the name resolution may be executed on other computer system.

Figure 28:
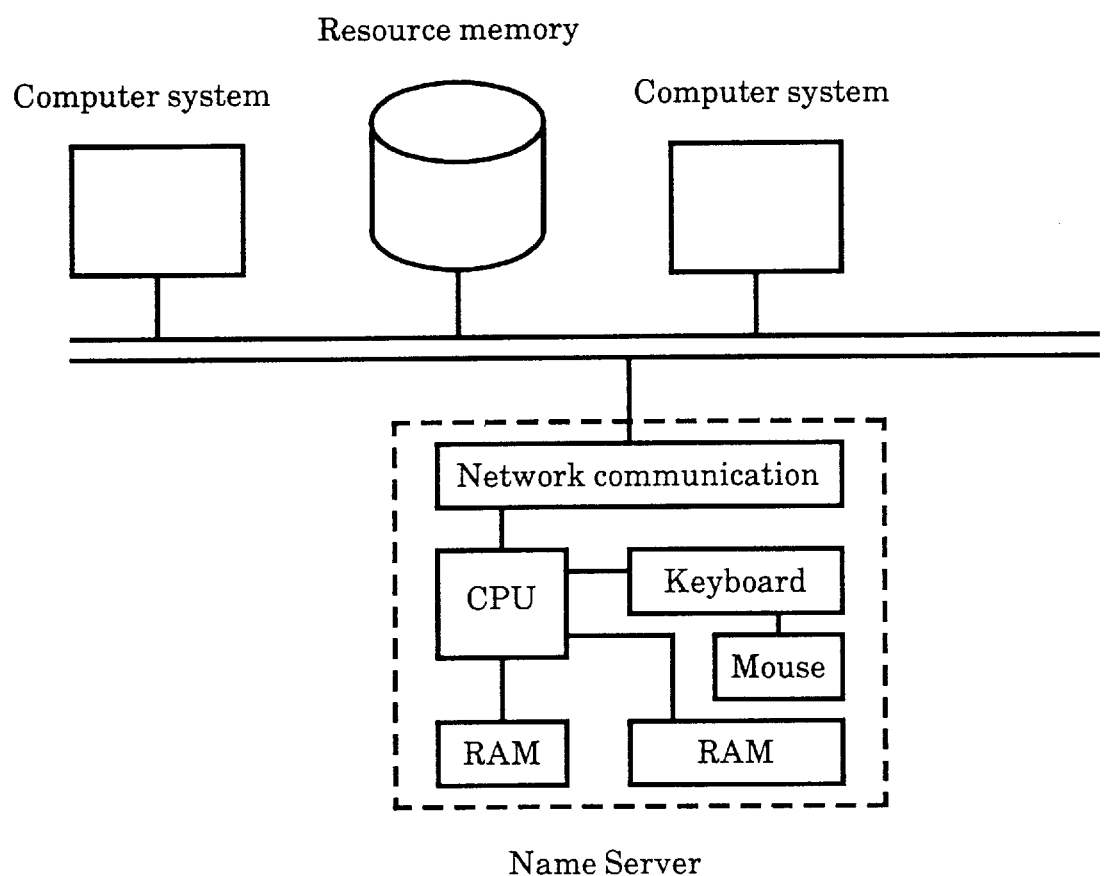
FIG. 28 is a block diagram of an example of a name service apparatus on a network.

The name service apparatus of the present invention as shown in FIG. 28 may be constituted so that the name service is controlled at one position of the network in centralized state. The name service apparatus itself can be realized as computer system including the communication section for communication with the computer system through the network, the CPU, the RAM, the secondary storage and the like.

In such constitution, the computer system sends the name to be resolved through the network communication section to the name service apparatus, and requests the name resolution. The name service apparatus resolves the name, and returns the position of the resource existing and the procedure name indicating the existing position of the program through the network to the computer system.

As clearly understood from the above description, according to the present invention, in the system realized by plural computer systems, the name of the virtual resource and the procedure are held and managed, and the access to the virtual resource becomes possible, thereby the flexibility in treatment of resources can be improved.

What is claimed is:

1. A name service apparatus comprising:
   resource management means for making correspondence of a position of an actual resource existing in a computer system to carry out information processing, a name of a procedure that processes the actual resource identified by the position, and a name of a virtual resource that is obtained by applying the procedure to the actual resource identified by the position;
   receiving means for receiving the name of the virtual resource;
   name resolution means for transforming the received name of the virtual resource into the position of the actual resource and the name of the procedure in correspondence with each other by said resource management means; and
   virtual resource realization means for realizing a virtual resource by applying the procedure determined by the name of the procedure obtained by the transformation of said name resolution means, to the actual resource determined by the position of the actual resource obtained by the transformation of said name resolution means.

2. A name service apparatus as set forth in claim 1, further comprising:
   system state acquisition means for acquiring state of said computer system; and
   procedure selection means for selecting at least one name of the procedure among names of procedures obtained by the transformation of said name resolution means, based on the state of the system acquired by said system state acquisition means.

3. A name service apparatus as set forth in claim 1,
   wherein said resource management means holds and manages correspondence information of positions of plural actual resources, a name of the procedure to equalize contents of the plural actual resources, and a predetermined name of the virtual resource being in correspondence to each other, and
   if the predetermined name of the virtual resource is received by said receiving means, said name resolution means obtains the position of the plural actual resources and the predetermined name of the procedure to equalize contents of the plural actual resources corresponding to the name of the virtual resource.

4. A name service apparatus as set forth in claim 1, further comprising procedure entity management means for holding the name of the procedure and entity of the procedure in correspondence to each other, for receiving the name of the procedure obtained by the transformation of said name resolution means, and for obtaining the entity of the procedure in correspondence to the received name of the procedure.

5. A name service apparatus in a network information system where resources of a plurality of computer systems to carry out information processing are distributed and arranged on a network, and the plurality of computer systems communicate with each other and operate, said name service apparatus comprising:
   resource management means for making correspondence of a position of an actual resource existing in the computer systems, a name of a procedure that processes the actual resource identified by the position, and a name of a virtual resource that is obtained by applying the procedure to the actual resources identified by the position;
   receiving means for receiving the name of the virtual resource;
   name resolution means for transforming the received name of the virtual resource into the position of the actual resource and the name of the procedure in correspondence with each other by said resource management means; and
   virtual resource realization means for realizing a virtual resource by applying the procedure determined by the name of the procedure obtained by the transformation of said name resolution means, to the actual resource determined by the position of the actual resource obtained by the transformation of said name resolution means.

6. A name service apparatus in a network information system where resources of a plurality of computer systems to carry out information processing are distributed and arranged on a network, and the plurality of computer systems communicate with each other and operate, said name service apparatus comprising:
   actual resource management means for making correspondence of a name of actual resource existing in the computer system and a position of the actual resource;
   virtual name correspondence means for holding name transforming procedure which transforms a name of a virtual resource into a name of another virtual resource or a name of an actual resource, and a name of a procedure that processes the virtual resource identified by the name of another virtual resource or the actual resource identified by the name of the actual resource, the virtual resource obtained by applying a procedure to an actual resource or another virtual resource;
   receiving means for receiving the name of the virtual resource;
   name resolution means for transforming the received name of the virtual resource into the name of actual resource and the name of the procedure by using recursively the name transforming procedure held in said virtual name correspondence means, and for transforming the name of the actual resource obtained by the transformation using the transforming procedure into the position of the actual resource in correspondence with the actual resource by said actual resource management means; and virtual resource realization means for realizing a virtual resource by applying the procedure determined by the name of the procedure obtained by the said name resolution means, to an actual resource determined by the position of the actual resource obtained by said name resolution means, and for obtaining the position of the realized virtual resource.

7. A name service apparatus as set forth in claim 6, further comprising:

system state acquisition means for acquiring state of said computer system; and procedure selection means for selecting at least one name of the procedure among names of procedures obtained by the transformation of said name resolution means, based on the state of the system acquired by said system state acquisition means.

8. A name service apparatus as set forth in claim 6, further comprising procedure entity management means for holding a name of the procedure and entity of the procedure in correspondence to each other, for receiving the name of the procedure obtained by said name resolution means, and for obtaining the entity of the procedure in correspondence to the received name of the procedure.

9. A name service apparatus comprising:

receiving means for receiving a name of a virtual resource which is obtained by applying a procedure to an actual resource existing in a computer system;

name analysis means for parsing the name of the virtual resource received by said receiving means, and for delimiting a first token and a second token, each of which is at least a part of the name of the virtual resource;

actual resource management means for making correspondence of the first token with a position of the actual resource;

procedure management means for making correspondence of the second token to a name of the procedure that processes the actual resource identified by the position of the actual resource corresponding to the first token by the actual resource management means;

name resolution means for receiving the first token and second token delimited by said name analysis means, and for transforming the first token to the position of the actual resource in correspondence to the first token by said actual resource management means, and for transforming the second token to the name of the procedure in correspondence to the second token by said procedure management means; and virtual resource realization means for realizing a virtual resource by applying the procedure determined by the name of procedure obtained by the transformation of said name resolution means, to an actual resource determined by position of the actual resource obtained by the transformation of said name resolution means, and for determining the position to store the realized virtual resource.

10. A name service apparatus as set forth in claim 9, further comprising:

system state acquisition means for acquiring state of said computer system; and procedure selection means for selecting at least one name of the procedure among names of procedures obtained by the transformation of said name resolution means, based on the state of the system acquired by said system state acquisition means.

11. A name service apparatus as set forth in claim 9, further comprising procedure entity management means for holding the name of the procedure and entity of the procedure in correspondence to each other, for receiving the name of the procedure obtained by said name resolution means, and for obtaining the entity of the procedure in correspondence to the received name of the procedure.

* * * * *